US012647738B2

(12) United States Patent
Guo

(10) Patent No.: US 12,647,738 B2
(45) Date of Patent: Jun. 2, 2026

(54) HEARING AID COMPRISING A LOOP TRANSFER FUNCTION ESTIMATOR AND A METHOD OF TRAINING A LOOP TRANSFER FUNCTION ESTIMATOR

(71) Applicant: Oticon A/S, Smørum (DK)

(72) Inventor: Meng Guo, Smørum (DK)

(73) Assignee: Oticon A/S, Smørum (DK)

( * ) Notice: Subject to any disclaimer, the term of this patent is extended or adjusted under 35 U.S.C. 154(b) by 147 days.

(21) Appl. No.: 18/798,847

(22) Filed: Aug. 9, 2024

(65) Prior Publication Data

US 2026/0046570 A1 Feb. 12, 2026

(30) Foreign Application Priority Data

Aug. 31, 2023 (EP) .................................... 23194652

(51) Int. Cl.
*H04R 25/00* (2006.01)

(52) U.S. Cl.
CPC ......... *H04R 25/507* (2013.01); *H04R 25/453* (2013.01); *H04R 2225/43* (2013.01)

(58) Field of Classification Search
CPC . H04R 25/507; H04R 25/453; H04R 2225/43
See application file for complete search history.

(56) References Cited

U.S. PATENT DOCUMENTS

2023/0044509 A1 2/2023 Guo et al.

FOREIGN PATENT DOCUMENTS

| | | | | |
|---|---|---|---|---|
| EP | 3236675 A1 | 10/2017 | | |
| EP | 3291581 A2 | 3/2018 | | |
| EP | 4033784 A1 | 2/2022 | | |
| EP | 4132009 A2 * | 2/2023 | ........... | H04R 25/453 |

* cited by examiner

*Primary Examiner* — Andrew Sniezek

(57) ABSTRACT

Disclosed herein are embodiments of a method of training a machine learning prediction model for use in an open loop transfer function estimator of a hearing aid. The method uses simulation data representing sound from a known, simulated acoustic environment of the hearing aid, the simulation data including a feedback path transfer function representative of an impulse response of a feedback path of the hearing aid.

15 Claims, 11 Drawing Sheets

HEARING AID COMPRISING A LOOP TRANSFER FUNCTION ESTIMATOR AND A METHOD OF TRAINING A LOOP TRANSFER FUNCTION ESTIMATOR

CROSS REFERENCE TO RELATED APPLICATIONS

Any and all application for which a foreign or domestic priority claim is identified in the Application Data Sheet as filed with the present application are hereby incorporated by reference under 37 CFR 1.57.

TECHNICAL FIELD

The present application relates to the field of hearing aids. The disclosure deals in particular with the estimation of loop transfer functions from an acoustic output to an input of a hearing aid.

In a hearing aid, the acoustic feedback problem creates an acoustic signal loop via the hearing aid forward path (from the input transducer(s) (e.g., one or more microphones) to the output transducer (e.g., a loudspeaker)) and the acoustic feedback paths (from the output transducer to the input transducer(s)).

The so-called open loop transfer function describes the important system characteristics, and its magnitude and phase over frequencies are very relevant for controlling feedback in a hearing aid.

Simple loop magnitude and/or phase estimations can be computed as a difference between a signal magnitude/phase and these values one loop delay earlier, as e.g., described in EP3291581A2.

However, this simple estimation can be sensitive to the input signals entering the hearing aid input transducers (e.g., microphones). Specific input signals with magnitude/phase changes over time can lead to wrongly estimated open-loop magnitude/phase values.

SUMMARY

In the present disclosure, a framework to estimate these open-loop magnitude and phase values using a machine learning (ML) based approach is presented. The present disclosure deals specifically with of the use of machine learning techniques for estimating loop transfer functions from an acoustic output to an acoustic input of a hearing aid.

A Hearing Aid:

A hearing aid (HD) comprising a forward path for processing an electric signal representing sound is provided.

The forward path comprises an input unit (IU) for receiving or providing at least one electric input signal (y(n)) representing sound of an environment of the hearing aid.

The forward path comprises a signal processing unit (PRO) configured to apply a frequency- and/or level-dependent gain (g(n)) to said at least one electric input signal (y(n)), or to a signal or signals originating therefrom. For example, n denotes time (e.g., a time index or a set of time indexes). The signal processing unit (PRO) is configured to provide a processed output signal (u(n)) in dependence thereof.

The forward path comprises an output transducer (OT) for generating stimuli perceivable as sound to a user in dependence of said processed output signal (u(n)).

The hearing aid further comprises an open loop transfer function estimator (OLTFE) comprising a trained ML prediction model configured to estimate an open loop transfer function (ξ'(ω,n)), in dependence of said at least one electric input signal (y(n)), or to a signal or signals originating therefrom, and the processed output signal (u(n)). For example, ω denotes frequency (e.g., a frequency index or a set of frequency indexes).

The prediction model is trained according to the method disclosed herein.

The terms "in dependence of" and "based on" may be used interchangeably.

Thereby an improved hearing aid may be provided.

The open loop transfer function can be construed as the transfer function for a signal travelling through the entire loop of a system. The frequency- and/or level-dependent gain (g(n)) (e.g., a forward path gain function) may e.g., include gain contributions provided by one or more of: noise reduction, directionality (for multi-channel systems), different hearing loss compensation schemes, and gain controlling algorithms, etc. The term 'gain' may in the present context represent amplification or attenuation (and e.g., be implemented in a linear or logarithmic domain). The terms "open loop transfer function" and "open-loop transfer function" may be used interchangeably.

The input unit may comprise an input transducer, e.g., a microphone, and/or a wireless receiver.

In one or more example hearing aids, the at least one electric input signal (y(n)) representing sound of an environment of the hearing aid may be construed as a signal from a real acoustic environment, such as an acoustic environment where the hearing aid is located at. In other words, the hearing aid may be functioning in normal mode of operation when open loop transfer function estimator (OLTFE) comprises a trained ML prediction model.

The prediction model may be trained in a training mode of operation using simulation data from known, simulated acoustic environments (e.g., situations). The training mode of operation may e.g., be initiated in the hearing aid via a user interface, or it may be performed in an off-line session. Simulation data can in the present context (as opposed to data from 'real' acoustic situations or environments) be construed as data that are generated as a result of a computer simulation using known inputs and known outputs. This has the advantage, e.g., that the contribution (v(n) in FIG. 1A) from the feedback path (FBP) to the input signal (y(n)) as picked up by the input transducer (and mixed with an external signal (x(n)) is known.

For example, the training mode of operation (e.g., a training stage) may be followed by the normal mode of operation (e.g., an inference stage). Put differently, after the training stage, weights of the prediction model may be fixed. In the normal mode of operation (e.g., an inference stage), the prediction model is trained (e.g., the weights may be fixed) and ready to be deployed. In the training mode of operation, the weights of the ML prediction model may be updated based on the simulation data.

In one or more example hearing aids, the open loop transfer function estimator (OLTFE) comprising the trained ML prediction model is configured to infer (e.g., deduce, estimate) an open loop transfer function estimate (e.g., ξ'(ω,n)) in dependence of the at least one electric input signal (y(n)), or to a signal or signals originating therefrom, and the processed output signal (u(n)).

In one or more example hearing aids, the hearing aid (e.g., open loop transfer function estimator) is configured to estimate the open loop transfer function (ξ'(ω,n)) by applying the trained ML prediction model to the at least one electric input signal (y(n)), or to a signal or signals originating therefrom, and the processed output signal (u(n)). The estimated open loop transfer function ($\xi'(\omega,n)$) may be seen as an inferred output of the prediction model (e.g., an inferred ML output). The at least one electric input signal (y(n)), or to a signal or signals originating therefrom, and the processed output signal (u(n)) may be seen as an inference data set or data from "real" acoustic environments. For example, the at least one electric input signal (y(n)), or to a signal or signals originating therefrom, and the processed output signal (u(n)) provided during the normal model of operation (e.g., inference stage) are different from the at least one electric input signal (y(n)), or to a signal or signals originating therefrom, and the processed output signal (u(n)) comprised in the simulation data used to train the prediction model during the training mode of operation (e.g., the training stage).

In one or more example hearing aid, the hearing aid (e.g., open loop transfer function estimator) is configured to determine the estimated open loop transfer function ($\xi'(\omega,n)$) by applying the trained ML prediction model to the at least one electric input signal (y(n)), or to a signal or signals originating therefrom, and the processed output signal (u(n)).

In one or more example hearing aids, the hearing aid further comprises a feedback control system configured to cancel or reduce feedback via an acoustic or mechanical or electrical feedback path transfer function ($\underline{h}(n)$) from the output transducer to said input unit in said at last one electric input signal (y(n)). For example, the feedback control system is configured to cancel or reduce feedback via an acoustic or mechanical or electrical feedback path (FBP) from the output transducer to the input unit in said at last one electric input signal (y(n)).

The terms "($\underline{h}(n)$)" and "(h(n))" may be used interchangeably.

In one or more example hearing aids, the feedback control system is configured to provide an estimate (v'(n)) of a current feedback signal (v(n)) received by the input unit via said feedback path (FBP). In one or more example hearing aids, the feedback control system is configured to provide a feedback corrected input signal (e(n)) in dependence of said at least one electric input signal (y(n)), or a signal dependent thereon, and the estimate (v'(n)) of the current feedback signal (v(n)). For example, the at least one electric input signal (y(n)) may be written as x(n)+v(n), where v(n) is the current feedback signal received by the input unit via the feedback path (FBP). The feedback path transfer function may be unknown to the hearing aid. In one or more example hearing aids, the feedback control system is configured to provide an estimate ($\underline{h}'(n)$) of the feedback path transfer function ($\underline{h}(n)$).

In one or more example hearing aids, the feedback path transfer function ($\underline{h}(n)$) is representative of an impulse response of a feedback path (FBP) from the output transducer (OT) to the input unit (IU) in said at last one electric input signal (y(n)).

In one or more example hearing aids, the feedback control system comprises an adaptive filter configured to provide the estimate ($\underline{h}'(n)$) of the feedback path transfer function ($\underline{h}(n)$) (e.g., a current feedback transfer function). For example, the adaptive filter can be configured to compensate for the acoustic feedback from the output transducer (OT) to the input unit (IU).

In one or more example hearing aids, the open loop transfer function estimator (OLTFE) comprising the trained ML prediction model is configured to estimate the open loop transfer function ($\xi'(\omega,n)$) in dependence of the feedback corrected input signal (e(n)) and the processed output signal (u(n)). For example, the open loop transfer function estimator (OLTFE) comprising the trained ML prediction model is configured to infer (e.g., deduce) an open loop transfer function estimate (e.g., $\xi'(\omega,n)$) in dependence of the feedback corrected input signal (e(n)), and the processed output signal (u(n)).

In one or more example hearing aids, the hearing aid (e.g., open loop transfer function estimator) is configured to estimate the open loop transfer function ($\xi'(\omega,n)$) by applying the trained ML prediction model to the feedback corrected input signal (e(n)), and the processed output signal (u(n)). The estimated open loop transfer function ($\xi'(\omega,n)$) may be seen as an inferred output of the prediction model (e.g., an inferred ML output). The feedback corrected input signal (e(n)), and the processed output signal (u(n)) may be seen as inference data or data from "real" acoustic environments. For example, the feedback corrected input signal (e(n)), and the processed output signal (u(n)) provided during the normal model of operation (e.g., inference stage) are different from the feedback corrected input signal (e(n)), and the processed output signal (u(n)) comprised in the simulation data used to train the prediction model during the training mode of operation (e.g., the training stage).

In one or more example hearing aids, the estimated open loop transfer function comprises an estimated open-loop magnitude ($\xi'_M(\omega,n)$) and an estimated open-loop phase ($\xi'_p(\omega,n)$). The terms "open loop magnitude" and "open-loop magnitude" may be used interchangeably. The terms "open loop phase" and "open-loop phase" may be used interchangeably.

In one or more example hearing aids, the frequency- and/or level-dependent gain function (g(n)) is controlled in dependence of the estimated open loop transfer function ($\xi'(\omega,n)$). In other words, the frequency- and/or level-dependent gain function (g(n)) may be controlled in dependence of the estimated open-loop magnitude ($\xi'_M(\omega,n)$) and the estimated open-loop phase ($\xi'_p(\omega,n)$).

In one or more example hearing aids, the hearing aid is constituted by or comprise an air-conduction type hearing aid or a bone-conduction type hearing aid, or a combination thereof.

The hearing aid may be adapted to provide a frequency dependent gain and/or a level dependent compression and/or a transposition (with or without frequency compression) of one or more frequency ranges to one or more other frequency ranges, e.g., to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise an (output transducer. The output transducer may comprise a receiver (loudspeaker) for providing the stimulus as an acoustic signal to the user (e.g., in an acoustic (air conduction based) hearing aid). The output transducer may comprise a vibrator for providing the stimulus as mechanical vibration of a skull bone to the user (e.g., in a bone-attached or bone-anchored hearing aid). The output unit may (additionally or alternatively) comprise a (e.g., wireless) transmitter for transmitting sound picked up-by the hearing aid to another device, e.g., a far-end communication partner (e.g., via a network, e.g., in a telephone mode of operation).

The hearing aid may comprise an input unit for providing an electric input signal representing sound. The input unit may comprise an input transducer, e.g., a microphone, for converting an input sound to an electric input signal. The input unit may comprise a wireless receiver for receiving a wireless signal comprising or representing sound and for providing an electric input signal representing said sound.

The wireless receiver and/or transmitter may e.g., be configured to receive and/or transmit an electromagnetic signal in the radio frequency range (3 kHz to 300 GHz). The wireless receiver and/or transmitter may e.g., be configured to receive and/or transmit an electromagnetic signal in a frequency range of light (e.g., infrared light 300 GHz to 430 THz, or visible light, e.g., 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g., described in the prior art. In hearing aids, a microphone array beamformer is often used for spatially attenuating background noise sources. The beamformer may comprise a linear constraint minimum variance (LCMV) beamformer. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing aid may comprise antenna and transceiver circuitry allowing a wireless link to an entertainment device (e.g., a TV-set), a communication device (e.g., a telephone), a wireless microphone, a separate (external) processing device, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g., an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g., located in a range from 50 MHz to 70 GHz, e.g. above 300 MHz, e.g., in an ISM range above 300 MHz, e.g., in the 900 MHz range or in the 2.4 GHz range or in the 5.8 GHz range or in the 60 GHz range (ISM=Industrial, Scientific and Medical, such standardized ranges being e.g., defined by the International Telecommunication Union, ITU). The wireless link may be based on a standardized or proprietary technology. The wireless link may be based on Bluetooth technology (e.g. Bluetooth Low-Energy technology, e.g., LE audio), or Ultra WideBand (UWB) technology.

The hearing aid may be constituted by or form part of a portable (e.g., configured to be wearable) device, e.g., a device comprising a local energy source, e.g., a battery, e.g., a rechargeable battery. The hearing aid may e.g., be a low weight, easily wearable, device, e.g., having a total weight less than 100 g, such as less than 20 g, such as less than 5 g.

The hearing aid may comprise a 'forward' (or 'signal') path for processing an audio signal between an input and an output of the hearing aid. A signal processor may be located in the forward path. The signal processor may be adapted to provide a frequency dependent gain according to a user's particular needs (e.g., hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g., in the range from 8 kHz to 48 kHz (adapted to the particular needs of the application) to provide digital samples $x_n$ (or x[n]) at discrete points in time $t_n$(or n), each audio sample representing the value of the acoustic signal at $t_n$ by a predefined number $N_b$ of bits, $N_b$ being e.g., in the range from 1 to 48 bits, e.g., 24 bits. Each audio sample is hence quantized using $N_b$ bits (resulting in $2^{Nb}$ different possible values of the audio sample). A digital sample x has a length in time of $1/f_s$, e.g., 50 μs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g., from an input transducer, such as a microphone) with a predefined sampling rate, e.g., 20 kHz. The hearing aids may comprise a digital-to-analogue (DA) converter to convert a digital signal to an analogue output signal, e.g., for being presented to a user via an output transducer.

The hearing aid, e.g., the input unit, and or the antenna and transceiver circuitry may comprise a transform unit for converting a time domain signal to a signal in the transform domain (e.g., frequency domain or Laplace domain, Z transform, wavelet transform, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g., a Discrete Fourier Transform (DFT) algorithm, or a Short Time Fourier Transform (STFT) algorithm, or similar) for converting a time variant input signal to a (time variant) signal in the (time-) frequency domain. The frequency range considered by the hearing aid from a minimum frequency $f_{min}$ to a maximum frequency $f_{max}$ may comprise a part of the typical human audible frequency range from 20 Hz to 20 kHz, e.g., a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g., of uniform width), where NI is e.g., larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g., increasing in width with frequency), overlapping or non-overlapping.

The hearing aid may be configured to operate in different modes, e.g., a normal mode and one or more specific modes, e.g., selectable by a user, or automatically selectable. A mode of operation may be optimized to a specific acoustic situation or environment, e.g., a communication mode, such as a telephone mode. A mode of operation may include a low-power mode, where functionality of the hearing aid is reduced (e.g., to save power), e.g. to disable wireless communication, and/or to disable specific features of the hearing aid.

The hearing aid may comprise a number of detectors configured to provide status signals relating to a current physical environment of the hearing aid (e.g., the current acoustic environment), and/or to a current state of the user wearing the hearing aid, and/or to a current state or mode of operation of the hearing aid. Alternatively or additionally, one or more detectors may form part of an external device in communication (e.g., wirelessly) with the hearing aid. An external device may e.g., comprise another hearing aid, a remote control, and audio delivery device, a telephone (e.g., a smartphone), an external sensor, etc.

One or more of the number of detectors may operate on the full band signal (time domain). One or more of the number of detectors may operate on band split signals ((time-) frequency domain), e.g., in a limited number of frequency bands.

The number of detectors may comprise a level detector for estimating a current level of a signal of the forward path. The detector may be configured to decide whether the current level of a signal of the forward path is above or below a given (L-) threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g., singing). The voice activity detector unit may be adapted to classify a current acoustic environment of the user as a VOICE or NO-VOICE environment. This has the advantage that time segments of the electric microphone signal comprising human utterances (e.g., speech) in the user's environment can be identified, and thus separated from time segments only (or mainly) comprising other sound sources (e.g., artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g., a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g., an acceleration sensor. The movement detector may be configured to detect movement of the user's facial muscles and/or bones, e.g., due to speech or chewing (e.g., jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g., including the current electromagnetic environment, e.g. the occurrence of electromagnetic signals (e.g., comprising audio and/or control signals) intended or not intended for reception by the hearing aid, or other properties of the current environment than acoustic);
b) the current acoustic situation (input level, feedback, etc.), and
c) the current mode or state of the user (movement, temperature, cognitive load, etc.);
d) the current mode or state of the hearing aid (program selected, time elapsed since last user interaction, etc.) and/or of another device in communication with the hearing aid.

The classification unit may be based on or comprise a neural network, e.g., a recurrent neural network, e.g., a trained neural network.

The hearing aid may comprise an acoustic (and/or mechanical) feedback control (e.g., suppression) or echo-cancelling system. Adaptive feedback cancellation has the ability to track feedback path changes over time. It is typically based on a linear time invariant filter to estimate the feedback path, but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g., compression, noise reduction, etc.

The hearing aid may comprise a hearing instrument, e.g., a hearing instrument adapted for being located at the ear or fully or partially in the ear canal of a user. A hearing system may comprise a speakerphone (comprising a number of input transducers (e.g., a microphone array) and a number of output transducers, e.g., one or more loudspeakers, and one or more audio (and possibly video) transmitters e.g., for use in an audio conference situation), e.g., comprising a beamformer filtering unit, e.g., providing multiple beamforming capabilities.

Use:

In an aspect, use of a hearing aid as described above, in the 'detailed description of embodiments' and in the claims, is moreover provided. Use may be provided in a system comprising one or more hearing aids (e.g., hearing instruments), classroom amplification systems, etc. Use of the hearing aid in applications prone to acoustic feedback is furthermore provided.

A Method:

A method of training a ML prediction model for use in an open loop transfer function estimator of a hearing aid (HD)

is provided. The open loop transfer function estimator (OLFTE) comprises the ML prediction model.

The method comprises executing a plurality of training iterations.

Each training iteration of the plurality of training iterations comprises obtaining, from the hearing aid, the simulation data.

The simulation data comprise at least one electric input signal (y(n)), a processed signal (u(n)), and a feedback path transfer function ($\underline{h}$(n)). The at least one electric input signal (y(n)) is representative of sound from a known, simulated acoustic environment of the hearing aid (HD). The at least one electric input signal (y(n)) may be seen as a known electric input signal (e.g., known input data). The processed output signal (u(n)) is indicative of an applied frequency- and/or level-dependent gain function (g(n)) to the at least one electric input signal (y(n)), or to a signal or signals originating therefrom. The feedback path transfer function ($\underline{h}$(n)) is representative of an impulse response of a feedback path (FBP) of the hearing aid. The feedback path transfer function ($\underline{h}$(n)) may be seen as a known feedback path transfer function (e.g., only verified for simulation data).

Each training iteration of the plurality of training iterations comprises determining a target open loop transfer function ($\hat{\xi}_{Targ}(\omega,n)$) based on the frequency- and/or level-dependent gain function (g(n)) and the feedback path transfer function ($\underline{h}$(n)).

Each training iteration of the plurality of training iterations comprises determining a training open loop transfer function ($\hat{\xi}_{Train}(\omega,n)$)) in dependence of said at least one electric input signal (y(n)), or to a signal or signals originating therefrom, the processed output signal (u(n)), and the frequency- and/or level-dependent gain function (g(n)).

The ML prediction model is configured to receive as inputs said at least one electric input signal (y(n)), or to a signal or signals originating therefrom, the processed output signal (u(n)), and the frequency- and/or level-dependent gain function (g(n)) (e.g., part of the simulation data) and provide as output the training open loop transfer function.

Each training iteration of the plurality of training iterations comprises updating the ML prediction model based on the target open loop transfer function ($\hat{\xi}_{Targ}(\omega,n)$) and the training open loop transfer function ($\hat{\xi}_{Train}(\omega,n)$)).

In one or more example methods, the ML prediction model can be seen as a machine learning (ML) algorithm. For example, the ML prediction model can be seen as a learning algorithm comprising the prediction model.

In one or more example methods, the simulation data comprise the applied frequency- and/or level-dependent gain function. In other words, the applied frequency- and/or level-dependent gain function may be inferred (e.g., determined) from the processed signal. For example, obtaining the simulation data comprises determining the applied frequency- and/or level-dependent gain function based on the processed signal.

In one or more example methods, the simulation data can comprise a current feedback signal (v(n)) received from the input unit (IU) via the feedback path (FBP). For example, the current feedback signal indicates a contribution from the feedback path (FBP) to the electric input signal (y(n)). For example, the current feedback signal may be indicative of the feedback path transfer function ($\underline{h}$(n)).

In one or more example methods, the simulation data comprise one or more of: the at least one electric input signal (y(n)), the processed signal (u(n)), the applied frequency- and/or level-dependent gain function (g(n)), and the feedback path transfer function ($\underline{h}$(n)).

In one or more example methods, the target open loop transfer function is determined based on known data, such as data from the known, simulated acoustic environment of the hearing aid. In other words, the target open loop transfer function may be seen as a desired (e.g., expected) open loop transfer function. For example, the target open loop transfer function may be determined based on the simulation data (e.g., part of the simulation data). In one or more example methods, the training open loop transfer function may be determined based on the simulation data (e.g., part of the simulation data). In one or more example methods, the prediction model may be trained with the target open loop transfer function and the training open loop transfer function.

Simulation data may refer in the present context (as opposed to data from 'real' acoustic situations or environments) to data that are generated as a result of a computer simulation using known inputs and known outputs. This has the advantage, e.g., that the contribution (v(n) in FIG. 1A) from the feedback path (FBP) to the input signal (y(n)) as picked up by the input transducer (and mixed with an external signal (x(n)) is known. For example, the at least one electric input signal (y(n)) may be written as x(n)+v(n), where v(n) is the current feedback signal received by the input unit via the feedback path (FBP). The current feedback signal may be known. The feedback path transfer function may be known.

In one or more example methods, determining the target open loop transfer function comprises determining a frequency response (e.g., G(ω,n)) of the applied frequency- and/or level-dependent gain function. In one or more example methods, determining the target open loop transfer function comprises determining a frequency response (e.g., H(ω,n)) of the feedback path transfer function ($\underline{h}$(n)).

For example, the frequency response of the applied frequency- and/or level-dependent gain function can be seen as the applied frequency- and/or level-dependent gain function in the frequency domain. In other words, the applied frequency- and/or level-dependent gain function may be in the time-domain. For example, the frequency response of the feedback path transfer function can be seen as the feedback path transfer function in the frequency domain. In other words, the feedback path transfer function may be in the time-domain.

In one or more example methods, determining the target open loop transfer function (e.g., $\hat{\xi}_{Targ}(\omega,n)$) comprises determining the target open loop transfer function as, $$\hat{\xi}_{Targ}(\omega, n) = G(\omega, n) \cdot H(\omega, n), \tag{1}$$

where n denotes time, ω denotes frequency, and (·) denotes a product (e.g., a multiplication).

For example, target open loop transfer function can be determined in dependence of equation (1).

In one or more example methods, the simulation data further comprises a feedback corrected input signal (e(n)) and an estimate ($\underline{h}$'(n)) of the feedback path transfer function ($\underline{h}$(n)). In one or more example methods, the feedback corrected input signal (e(n)) is indicative of a signal with reduced or cancelled acoustic or mechanical or electrical feedback, the acoustic or mechanical or electrical feedback originating from the feedback path (FBP).

In one or more example methods, each training iteration of the plurality of training iterations comprises determining the target open loop transfer function ($\hat{\xi}_{Targ}(\omega,n)$) based on the frequency- and/or level-dependent gain function (g(n)), the feedback path transfer function ($\underline{h}$(n)), and the estimate ($\underline{h}$'(n)) of the feedback path transfer function ($\underline{h}$(n)).

In one or more example methods, each training iteration of the plurality of training iterations comprises determining the training open loop transfer function ($\hat{\xi}_{Train}(\omega,n)$) in dependence of said the feedback corrected input signal (e(n)), the processed output signal (u(n)), and the frequency- and/or level-dependent gain function (g(n)).

For example, the method comprises obtaining the feedback corrected input signal and the estimate of the feedback path transfer function from a feedback control system of the hearing aid. The feedback control system of the hearing aid may be configured to cancel or reduce feedback via an acoustic or mechanical or electrical feedback path transfer function ($\underline{h}$(n)) from the output transducer (OT) to the input unit (IU) in said at last one electric input signal (y(n)). The feedback control system of the hearing aid may be configured to provide an estimate (v'(n)) of a current feedback signal (v(n)) received from the input unit (IU) via the feedback path (FBP). The feedback control system of the hearing aid may be configured to provide the feedback corrected input signal (e(n)) in dependence of (e.g., based on and/or in function of) the at least one electric input signal (y(n)), or a signal dependent thereon, and the estimate of a current feedback signal (v'(n)). The feedback control system may be configured to provide the estimate ($\underline{h}$'(n)) of the feedback path impulse response ($\underline{h}$(n)). For example, the feedback control system comprises an adaptive filter (ALG, FIL, $\underline{h}$'(n)) configured to provide the estimate ($\underline{h}$'(n)) of the feedback path transfer function ($\underline{h}$(n)). In other words, the method comprises obtaining the estimate of the feedback path transfer function from the adaptive filter (ALG, FIL, $\underline{h}$'(n)).

In one or more example methods, determining the target open loop transfer function ($\hat{\xi}_{Targ}(\omega,n)$) comprises determining a frequency response G(ω,n) of the applied frequency- and/or level-dependent gain function (g(n)). In one or more example methods, determining the target open loop transfer function ($\hat{\xi}_{Targ}(\omega,n)$) comprises determining a frequency response H(ω,n) of the feedback path transfer function ($\underline{h}$(n)). In one or more example methods, determining the target open loop transfer function ($\hat{\xi}_{Targ}(\omega,n)$) comprises determining a frequency response H'(ω,n) of the estimate ($\underline{h}$'(n)) of the feedback path transfer function ($\underline{h}$(n)).

For example, the frequency response of the applied frequency- and/or level-dependent gain function can be seen as the applied frequency- and/or level-dependent gain function in the frequency domain. In other words, the applied frequency- and/or level-dependent gain function may be in the time-domain. For example, the frequency response of the feedback path transfer function can be seen as the feedback path transfer function in the frequency domain. In other words, the feedback path transfer function may be in the time-domain. For example, the frequency response of the estimate of the feedback path transfer function can be seen as the estimate of the feedback path transfer function in the frequency domain.

In other words, the estimate of the feedback path transfer function may be in the time-domain.

In one or more example methods, determining the target open loop transfer function ($\hat{\xi}_{Targ}(\omega,n)$) comprises determining the target open loop transfer function ($\hat{\xi}_{Targ}(\omega,n)$) as, $$\hat{\xi}_{Targ}(\omega, n) = G(\omega, n)\cdot(H(\omega, n) - H'(\omega, n)), \tag{2}$$

wherein n denotes time, ω denotes frequency, and (·) denotes a product (e.g., a multiplication).

For example, target open loop transfer function can be determined in dependence of equation (2).

In one or more example methods, the ML prediction model comprises a deep neural network (DNN). For example, an DNN can comprise at least two neural networks (e.g., layers). For example, an DNN can comprise one or more of: a convolutional neural network (CNN), a recurrent neural network (RNN). For example, an DNN can comprise one or more of: a convolutional-based neural network, a recurrent-based neural network. An RNN may include a gated recurrent unit (GRU). In one or more example methods, the ML prediction model comprises one or more of: an DNN, an CNN, an RNN, and any other suitable neural networks.

In one or more example methods, determining the training open loop transfer function ($\hat{\xi}_{Train}(\omega,n)$)) comprises providing the at least one electric input signal (y(n)), or to a signal or signals originating therefrom, the processed output signal (u(n)), and the frequency- and/or level-dependent gain function (g(n)) as input to the ML prediction model.

In one or more example methods, each training iteration comprises applying the at least one electric input signal (y(n)), or to a signal or signals originating therefrom, the processed output signal (u(n)), and the frequency- and/or level-dependent gain function (g(n)) as inputs to the ML prediction model (e.g., to the ML model) for provision of the training open loop transfer function (e.g., a ML output).

In one or more example methods, updating the ML prediction model comprises determining a training error signal in dependence of the target open loop transfer function ($\hat{\xi}_{Train}(\omega,n)$)) and the training open loop transfer function ($\hat{\xi}_{Train}(\omega,n)$))). In one or more example methods, updating the ML prediction model comprises updating weights, using a learning rule, of the ML prediction model based on the training error signal. In one or more example methods, the method can comprise defining a loss function (e.g., a cost function) based on the target open loop transfer function and the training open loop transfer function for provision of the training error signal. For example, the loss function of the ML prediction model can quantify a difference between the training open loop transfer function (e.g., predicted by the ML prediction model) and the target open loop transfer function (e.g., an expected output of the ML prediction model). In one or more examples, the training error signal is indicative of a training loss associated with the ML prediction model. Minimisation of such training loss (e.g., reducing the training error signal) may indicate a proper (e.g., satisfactory, adequate) prediction of the training open loop transfer function. In one or more example methods, the loss function can be one or more of: a mean squared error (MSE), a binary cross-entropy (BCE) loss function, and any other suitable loss functions.

The training open loop transfer function may converge to the target open loop transfer function by performing each training iteration of the plurality of training iterations of the method.

In one or more example methods, training the prediction model comprises updating weights, of the ML prediction model based on the training error signal. For example, the weights of the ML prediction model may be updated (e.g., adjusted) when the training loss is minimized. For example, the weights of the ML prediction model may not be updated (e.g., adjusted) when the training loss is not minimized. The updated (e.g., adjusted) weights may be stored in a memory associated with the ML prediction model (e.g., a memory comprised in the ML prediction model (e.g., in ML-PM block of FIG. 7).

In one or more example methods, the target open loop transfer function can be construed as a reference open loop transfer function or a true open loop transfer function. For example, the target open loop transfer function can be construed as a true open loop transfer function or reference open loop transfer function in the sense the target open loop transfer function is compared with the training open loop transfer function. Target open loop transfer function, true open loop transfer function, and reference open loop transfer function may be used interchangeably.

For example, the training open loop transfer function can be referred as a current open loop transfer function in the present disclosure. Training open loop transfer function and current open loop transfer function may be used interchangeably.

In one or more example methods, the training open loop transfer function ($\hat{\xi}_{Train}(\omega,n)$) comprises a training open-loop magnitude ($\hat{\xi}_{Train,M}(\omega,n)$) and a training open-loop phase ($\hat{\xi}_{Train,P}(\omega,n)$).

In one or more example methods, the target open loop transfer function ($\hat{\xi}_{Targ}(\omega,n)$) comprises a target open-loop magnitude ($\hat{\xi}_{Targ,M}(\omega,n)$) and a target open-loop phase ($\hat{\xi}_{Targ,P}(\omega,n)$). For example, the target open-loop magnitude and the target open-loop phase can be determined (e.g., computed) according to equation (1). For example, the target open-loop magnitude and the target open-loop phase can be determined (e.g., computed) according to equation (2).

Optionally, updating the ML prediction model comprises determining a training error signal in dependence of the target open-loop magnitude, the target open-loop phase, the training open-loop magnitude, and the training open-loop phase.

For example, the loss function of the ML prediction model can quantify a first difference between the target open-loop magnitude and the training open-loop magnitude. For example, the loss function of the ML prediction model can quantify a second difference between the target open-loop phase and the training open-loop phase. For example, the weights of the ML prediction model may be updated (e.g., adjusted) when the first difference and the second difference is minimized.

For example, the target open-loop magnitude ($\hat{\xi}_{Targ,M}(\omega,n)$) and the target open-loop phase ($\hat{\xi}_{Targ,P}(\omega,n)$) can be represented in form of real and imaginary values. For example, the training open-loop magnitude ($\hat{\xi}_{Train,M}(\omega,n)$) and the training open-loop phase ($\hat{\xi}_{Train,P}(\omega,n)$) can be represented in form of real and imaginary values.

In one or more example methods, the method is performed by an external device (e.g., a computer). For example, the method of training may be a computer-implemented method.

In one or more example methods, training of the ML prediction model can be performed in an off-line training session. In other words, a known, simulated acoustic environment may be construed as an environment of the hearing aid modelling (e.g., simulating) real-world conditions (e.g., situations). For example, such known, simulated acoustic environment(s) can be generated by computer simulation(s). For example, an off-line training session can be construed as a representative modelling of real-word conditions (e.g., situations) in a computer simulation.

In one or more example methods, the method can be performed using simulation data from a plurality of known, simulated acoustic environments (e.g., known, simulated acoustic situations). For example, the simulation data can be provided by computer simulation of the hearing aid in an acoustic environment (e.g., or in a plurality of acoustic environments). The simulation data may be construed as training data, e.g., for training the ML prediction model.

In one or more example methods, the simulation data can comprise data from a multitude of computer simulations (e.g., of a plurality of known, simulated acoustic environments, and/or a plurality of hearing aid systems). For example, such data from a multitude of computer simulations can comprise different feedback path transfer functions ($\underline{h}(n)$), different frequency- and/or level-dependent gain function ($\underline{g}(n)$), and different external input signals ($x(n)$) to the hearing aid, where the external input signal is the part of the electric input signal that is not due to feedback. For example, the frequency- and/or level-dependent gain function may be seen as a forward path processing gain function.

In one or more example methods, the simulation data may comprise data from a multitude of sound sources. The multitude of sound sources may comprise one or more of: noise sounds, speech sounds, music sounds, sounds recorded from everyday life as the incoming sounds $x(n)$ to the hearing aid. The multitude of sound sources may comprise one or more of: speech, noise, speech mixed with different types of noise in different amounts (e.g., to provide different signal-to-noise ratios (SNRs)), sounds from daily life (e.g., from different environments comprising a multitude of sound sources in various mixtures).

In one or more example methods, the target open loop transfer function (e.g., comprising a target open-loop magnitude and a target open-loop phase) can be determined based on equation (1) for a hearing aid without a feedback cancellation system. In one or more example methods, the target open loop transfer function (e.g., comprising a target open-loop magnitude and a target open-loop phase) can be determined based on equation (2) for a hearing aid comprising a feedback cancellation system. For example, the target open loop transfer function (e.g., comprising a target open-loop magnitude and a target open-loop phase) for a hearing aid without a feedback cancellation system, and a hearing aid comprising a feedback cancellation system may be computed in a simulation setup. Further, different hearing aid signals (e.g., $y(n)$, $u(n)$, $e(n)$) and computed magnitude and phase of the open loop transfer functions may be provided to the ML prediction model.

In other words, the simulation data may have many different origins (speech, noise, daily life, input, output, feedback compensated, etc.).

The trained ML prediction model may be the (final) result of the training with the simulation data. In other words, the ML prediction model may be trained by updating the ML prediction model during a training mode of operation. For example, the method of training can be performed during a training mode of operation of the hearing aid.

A training procedure with simulated data is illustrated in FIG. 2A. The use in a hearing aid with the resulting, e.g., trained, ML prediction model exposed to real signals from real acoustic situations (e.g., environments) is illustrated in FIG. 2B.

The whole procedure may also be configured to train any functions/values, which are dependent on the open loop transfer functions.

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g., in synthesized DNA strands). Combinations of the above should also be included within the scope of computer-readable media. In addition to being stored on a tangible medium, the computer program can also be transmitted via a transmission medium such as a wired or wireless link or a network, e.g., the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

a Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g., control and status signals, possibly audio signals) can be exchanged or forwarded from one to the other.

The auxiliary device may be constituted by or comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the audio processing device via the smartphone (the hearing aid(s) comprising an appropriate wireless interface to the smartphone, e.g., based on Bluetooth or some other standardized or proprietary scheme).

The auxiliary device may be constituted by or comprise an audio gateway device adapted for receiving a multitude of audio signals (e.g., from an entertainment device, e.g., a TV or a music player, a telephone apparatus, e.g., a mobile telephone or a computer, e.g., a PC, a wireless microphone, etc.) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g., a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g., a smartphone, or on another portable device allowing communication with said hearing aid or said hearing system.

Definitions

In the present context, a hearing aid, e.g., a hearing instrument, refers to a device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. Such audible signals may e.g., be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing aid may be configured to be worn in any known way, e.g., as a unit arranged behind the ear with a tube leading radiated acoustic signals into the ear canal or with an output transducer, e.g., a loudspeaker, arranged close to or in the ear canal, as a unit entirely or partly arranged in the pinna and/or in the ear canal, as a unit, e.g., a vibrator, attached to a fixture implanted into the skull bone, as an attachable, or entirely or partly implanted, unit, etc. The hearing aid may comprise a single unit or several units communicating (e.g., acoustically, electrically or optically) with each other. The loudspeaker may be arranged in a housing together with other components of the hearing aid, or may be an external unit in itself (possibly in combination with a flexible guiding element, e.g., a dome-like element).

A hearing aid may be adapted to a particular user's needs, e.g., a hearing impairment. A configurable signal processing circuit of the hearing aid may be adapted to apply a frequency and level dependent compressive amplification of an input signal. A customized frequency and level dependent gain (amplification or compression) may be determined in a fitting process by a fitting system based on a user's hearing data, e.g., an audiogram, using a fitting rationale (e.g., adapted to speech). The frequency and level dependent gain may e.g., be embodied in processing parameters, e.g., uploaded to the hearing aid via an interface to a programming device (fitting system), and used by a processing algorithm executed by the configurable signal processing circuit of the hearing aid.

A 'hearing system' refers to a system comprising one or two hearing aids, and a 'binaural hearing system' refers to a system comprising two hearing aids and being adapted to cooperatively provide audible signals to both of the user's ears. Hearing systems or binaural hearing systems may further comprise one or more 'auxiliary devices', which communicate with the hearing aid(s) and affect and/or benefit from the function of the hearing aid(s). Such auxiliary devices may include at least one of a remote control, a remote microphone, an audio gateway device, an entertainment device, e.g., a music player, a wireless communication device, e.g., a mobile phone (such as a smartphone) or a tablet or another device, e.g., comprising a graphical interface. Hearing aids, hearing systems or binaural hearing systems may e.g., be used for compensating for a hearing-impaired person's loss of hearing capability, augmenting or protecting a normal-hearing person's hearing capability and/or conveying electronic audio signals to a person. Hearing aids or hearing systems may e.g. form part of or interact with public-address systems, classroom amplification systems, etc.

An embodiment of a hearing aid is illustrated in FIG. 4. The invention is set out in the appended set of claims.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g., application specific), microprocessors, microcontrollers, digital signal processors (DSPs), field programmable gate arrays (FPGAs), programmable logic devices (PLDs), gated logic, discrete hardware circuits, printed circuit boards (PCB) (e.g., flexible PCBs), and other suitable hardware configured to perform the various functionality described throughout this disclosure, e.g., sensors, e.g., for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing aids. The disclosure deals in particular with the estimation of loop transfer functions from an acoustic output to an input of a hearing aid.

Figure 1A:
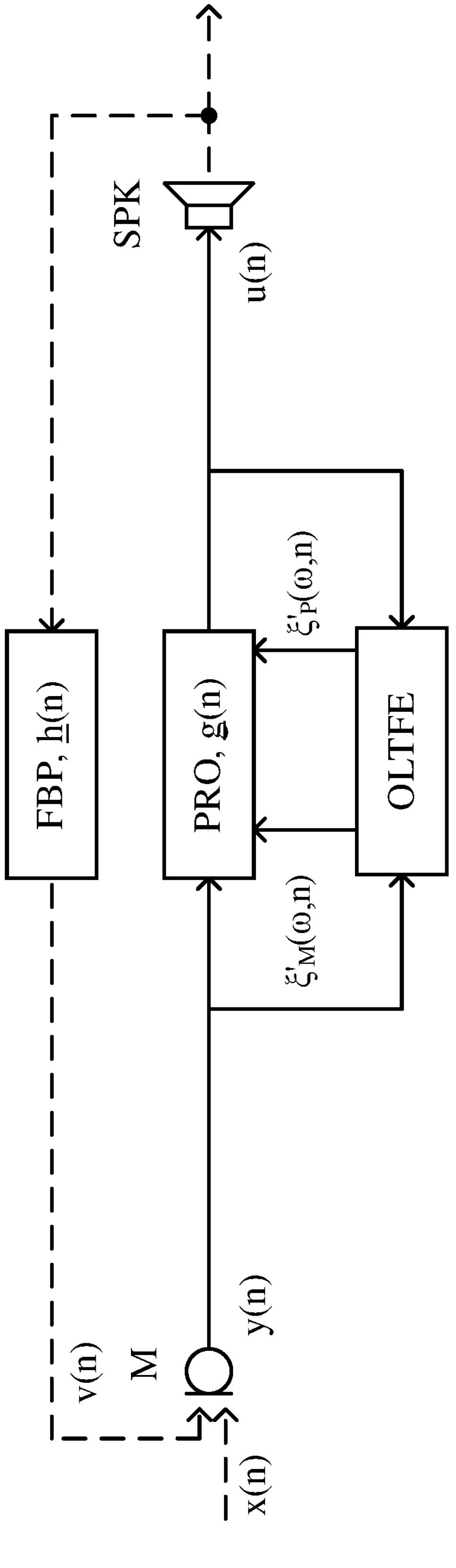
FIG. 1A shows a closed-loop hearing aid system without a feedback cancellation system.
Figure 1B:
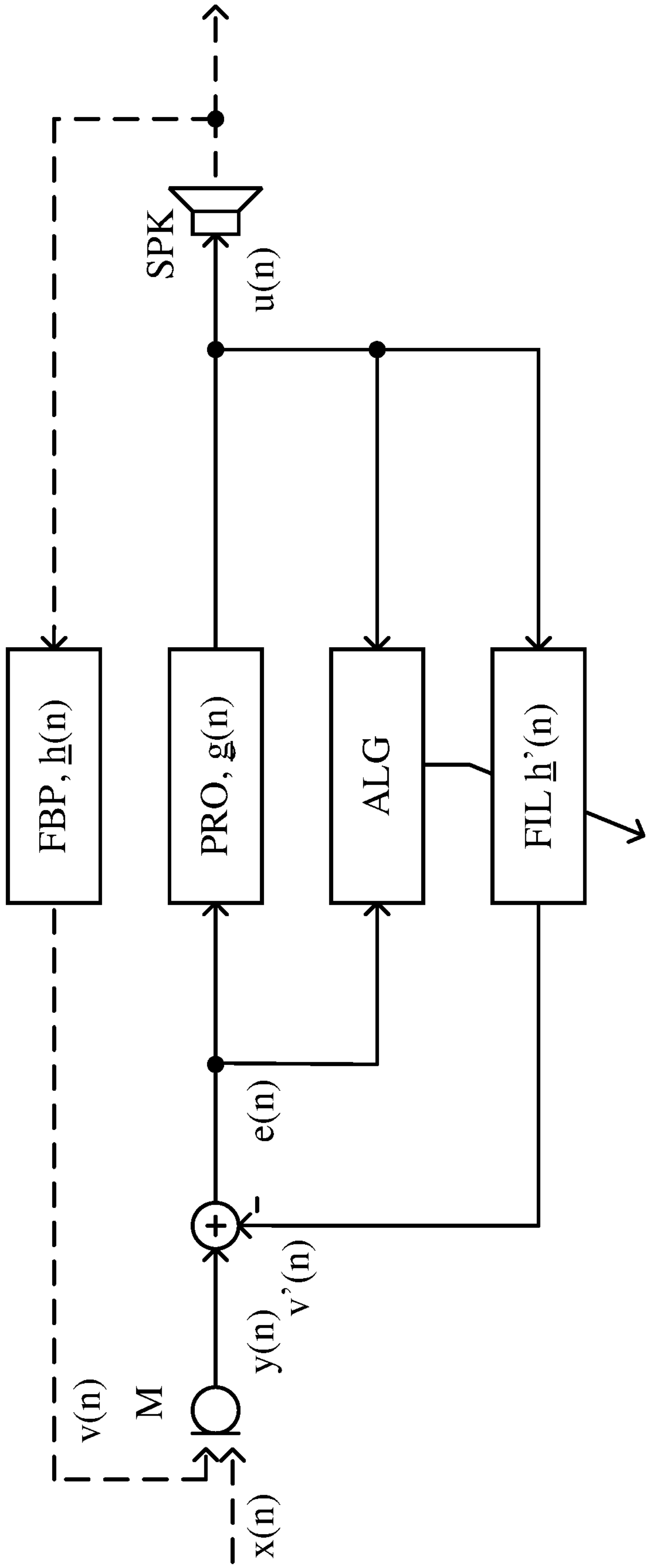
FIG. 1B shows a single-channel hearing aid comprising a feedback cancellation system.

FIG. 1A shows a closed-loop hearing aid system without a feedback cancellation system, whereas FIG. 1B shows a single-channel hearing aid comprising a feedback cancellation system.

FIG. 1A shows a simple diagram of an exemplary hearing aid comprising a forward path and a feedback path (FBP) together forming a closed loop. For example, the feedback path (FBP) may comprise an impulse response represented by a feedback path transfer function ($\underline{h}(n)$). The forward path comprises an input transducer (M), e.g., a microphone, for picking up sound from the environment of the hearing aid and providing an electric input signal ($y(n)$) representative of the sound. The forward path further comprises a processor (PRO) for applying gain to the electric input signal (or to a signal depending thereon) and providing a processed signal ($u(n)$) in dependence thereof. For example, the processor (PRO) is configured to apply a frequency- and/or level-dependent gain function ($g(n)$) to the electric input signal (or to a signal depending thereon). The forward path further comprises an output transducer (SPK), e.g., a loudspeaker, for providing stimuli perceivable by the user as sound in dependence of the processed signal (u(n)). The time variant transfer functions of the forward path (e.g., the applied frequency- and/or level-dependent gain function) and the feedback path (e.g., the feedback path transfer function) are indicated as $\underline{g}(n)$ and $\underline{h}(n)$, respectively, where n represents time. The applied frequency- and/or level-dependent gain function (g(n)) (e.g., the applied frequency- and/or level-dependent gain function being indicative of an impulse response of the forward path, such as a gain impulse response) (here termed 'gain function $\underline{g}(n)$') and the feedback path transfer function ($\underline{h}(n)$) (e.g., indicative of an impulse response of the feedback path) are vectors, where their individual elements represent a reaction over time to an external change (in this particular case the reaction to an impulse). Each vector represents samples of the impulse response at time index n. In a dynamic system, the impulse response may change over time (so that the impulse response vectors depend on time index n). In a static system the impulse response will remain constant and the impulse response vectors are independent of the time index n.

Closed-Loop Hearing Aid System without the Feedback Cancellation System Operating in a Training Mode of Operation:

The closed-loop hearing aid system without the feedback cancellation system, such as hearing aid of FIG. 1A, may be seen as a hearing aid operating in a training mode of operation. In other words, simulation data may be provided by a computer simulation simulating the hearing aid in a known, simulated acoustic environment (e.g., modelling real-word conditions or environments). The ML prediction model for use in the open loop transfer function estimator (OLTFE) when the hearing aid is operating in a normal mode of operation may be trained using the simulation data from the known, simulated acoustic environment. For example, in the training mode of operation, weights of the ML prediction model may be updated based on the simulation data.

For example, the simulation data comprises an electric input signal, a processed output signal, and a feedback path transfer function. For example, the electric input signal (y(n)) is representative of sound from the known, simulated acoustic environment of the hearing aid. For example, the processed output signal (u(n)) is indicative of the applied frequency- and/or level-dependent gain function (g(n)) to the electric input signal (y(n)). The simulation data may comprise the frequency- and/or level-dependent gain function (g(n)). Optionally, the frequency- and/or level-dependent gain function (g(n)) may be inferred from the electric input signal (y(n)) together with the processed output signal (u(n)). For example, the feedback path transfer function ($\underline{h}(n)$) is representative of an impulse response of the feedback path (FBP) of the hearing aid.

Figure 7:
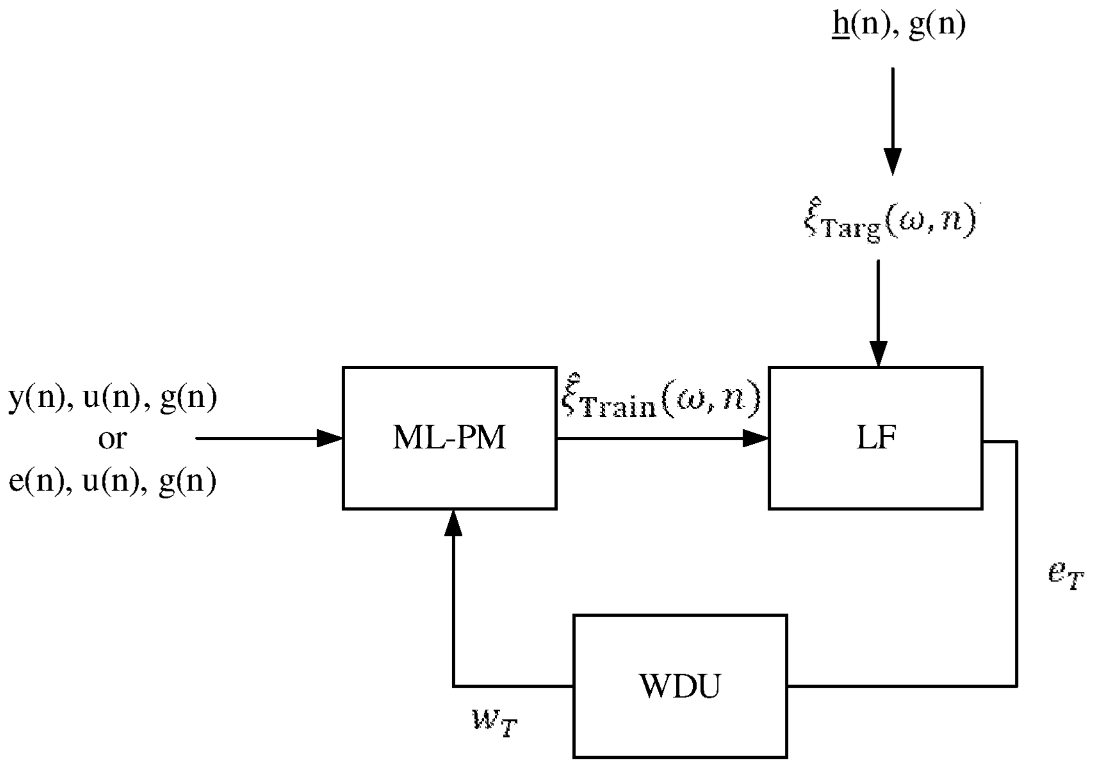

A target open loop transfer function ($\hat{\xi}_{Targ}(\omega,n)$ of FIG. 7) may be used to train the prediction model. For example, the target open loop transfer function can be determined based on the frequency- and/or level-dependent gain function (g(n)) and the feedback path transfer function ($\underline{h}(n)$).

The target open loop transfer function may be determined as, $$\xi_{Targ}(\omega, n) = G(\omega, n) \cdot H(\omega, n), \tag{1}$$

where G(ω,n) denotes a frequency response of the frequency- and/or level-dependent gain function $\underline{g}(n)$ at time index n, H(ω,n) denotes a frequency response of the feedback path transfer function $\underline{h}(n)$ at time index n, ω denotes frequency, and (·) denotes a product operator.

A training open loop transfer function may be used to train the prediction model. For example, the training open loop transfer function can be determined based on the electric input signal (y(n)), the processed output signal (u(n)), and the frequency- and/or level-dependent gain function (g(n)).

For example, the ML prediction model is configured to receive as input the simulation data and provide as output the training open loop transfer function.

For example, the system of FIG. 1A can, in the training mode of operation, comprise an open loop transfer function estimator (OLTFE) comprising the ML prediction model configured to provide the training open loop transfer function ($\hat{\xi}_{Train}(\omega,n)$) of FIG. 7 (e.g., a training open-loop magnitude ($\hat{\xi}_{Train,M}(\omega,n)$) and a training open-loop phase ($\hat{\xi}_{Train,P}(\omega,n)$) in dependence of the simulation data.

The target open loop transfer function ($\hat{\xi}_{Targ}(\omega,n)$ of FIG. 7), in particular its magnitude $\hat{\xi}_{Targ,M}(\omega,n)$ and phase $\hat{\xi}_{Targ,P}(\omega,n)$ may be computed according to equation (2). For example, a target open loop transfer function may be also termed as a true open loop transfer function or a reference open loop transfer function.

Closed-Loop Hearing Aid System without the Feedback Cancellation System Operating in a Normal Mode of Operation:

The closed-loop hearing aid system without the feedback cancellation system, such as hearing aid of FIG. 1A, may be seen as a hearing aid operating in a normal mode of operation. In other words, the open loop transfer function estimator (OLTFE) of the hearing aid may comprise a trained ML prediction model (e.g., weights of the ML prediction model may be fixed) and ready to be deployed in the hearing aid.

For example, the system of FIG. 1A (as shown in the lower part of FIG. 1A) comprises an open loop transfer function estimator (OLTFE) comprising a trained ML prediction model configured to estimate an open loop transfer function (ξ'(ω,n)) in dependence of test data from real acoustic environments (e.g., situations), such as sound of an environment of the hearing aid. For example, the open loop transfer function estimator (OLTFE) receives as inputs the electric input signal (y(n)) and the processed signal (u(n)), and provides as outputs the estimated open loop transfer function (ξ'(ω,n)) (e.g., an estimated open-loop magnitude ($\xi'_M(\omega,n)$) and an estimated open-loop phase ($\xi'_p(\omega,n)$)). The estimated open loop transfer function (ξ'(ω,n)) (e.g., an estimated open-loop magnitude ($\xi'_M(\omega,n)$) and an estimated open-loop phase ($\xi'_p(\omega,n)$)) may be used to modify (e.g., adjust, update) the frequency- and/or level-dependent gain function ($\underline{g}(n)$) of the signal processing unit (PRO). If, e.g., the open-loop magnitude is getting close to or exceeding 1 (0 dB), and/or the open-loop phase is getting close to 0 degrees at some frequencies ω, i.e., a positive feedback is likely to appear, the frequency- and/or level-dependent gain function $\underline{g}(n)$ may be changed so that its amplification at these frequencies ω will be reduced.

In other words, the frequency- and/or level-dependent gain function ($\underline{g}(n)$) may be modified when the open-loop magnitude is getting close to or exceeding 1 (0 dB), and/or the open-loop phase is getting close to 0 degrees at some frequencies ω. For example, the frequency- and/or level-dependent gain function ($\underline{g}(n)$) can be modified upon estimating the open-loop magnitude as getting close to or exceeding 1 (0 dB), and/or the open-loop phase as getting close to 0 degrees at some frequencies ω.

Optionally, the frequency- and/or level-dependent gain function ($\underline{g}$(n)) may be modified when the estimated open-loop magnitude is approximately equal or greater to a magnitude threshold (e.g., not necessarily 0 dB) at some frequencies. For example, the frequency- and/or level-dependent gain function ($\underline{g}$(n)) may be modified when the estimated open-loop phase is approximately meets a phase threshold (e.g., not necessarily 0 degrees) at some frequencies.

For example, the frequency- and/or level-dependent gain function ($\underline{g}$(n)) may be modified when the estimated open-loop magnitude is approximately equal to 0 dB. Optionally, the frequency- and/or level-dependent gain function ($\underline{g}$(n)) may be modified when the estimated open-loop magnitude is within a magnitude range comprising a lower range limit and an upper range limit. The lower range limit of the magnitude range may be approximately equal to −10 dB, −6 dB, −3 dB, or 0 dB. The upper range limit of the magnitude range may be approximately equal to +3 dB, +6 dB, +10 dB, or values greater than +10 dB. A magnitude range can include the following ranges: [−10 dB, +3 dB], [−10 dB, +6 dB], [−10 dB, +10 dB], [−10 dB, >+10 dB], [−6 dB, +3 dB], [−6 dB, +6 dB], [−6 dB, +10 dB], [−10 dB, >+10 dB], [−3 dB, +3 dB], [−3 dB, +6 dB], [−3 dB, +10 dB], [−3 dB, >+10 dB], [0 dB, +3 dB], [0 dB, +6 dB], [0 dB, +10 dB], [0 dB, >+10 dB]. For example, ">+10 dB" can be seen as a value greater than 10 dB. For example, the magnitude range can include a range of [−20 dB, 0 dB].

For example, the frequency- and/or level-dependent gain function ($\underline{g}$(n)) may be modified when the estimated open-loop phase is approximately equal to 0 degrees. Optionally, the frequency- and/or level-dependent gain function ($\underline{g}$(n)) may be modified when the estimated open-loop magnitude is within a phase range. For example, the phase range can include the following ranges: [−180 degrees, +180 degrees], [−30 degrees, +30 degrees], [−60 degrees, 60 degrees], [−60 degrees, 30 degrees], and [−30 degrees, 60 degrees].

For example, the modification in the frequency- and/or level-dependent gain function ($\underline{g}$(n)) can be different over frequencies (e.g., as $\underline{g}$(n) is a frequency dependent function).

In the embodiment of FIG. 1A, $\xi'_M(\omega,n)$ and $\xi'_p(\omega,n)$ indicate the estimated open-loop magnitude ($\xi'_M(\omega,n)$) and the estimated open-loop phase ($\xi'_p(\omega,n)$)), respectively.

FIG. 1B is similar to FIG. 1A showing a single-channel hearing aid, but the hearing aid of FIG. 1B additionally comprises a feedback cancellation system.

The hearing aid processing is described by the processing function $\underline{g}$(n) of the processor (PRO). The acoustic feedback path (FBP) from the receiver (loudspeaker, SPK) to the microphone (M) may be represented by a feedback path transfer function $\underline{h}$(n), whereas an adaptive filter (ALG, FIL) having an estimate ($\underline{h}$'(n)) of the feedback path transfer function ($\underline{h}$(n)) (e.g., representative of an impulse response of the estimate of the feedback path (FBP)) models the true and practically unknown feedback path (FBP), such as represented by the feedback path transfer function $\underline{h}$(n). For example, the adaptive filter comprises an adaptive algorithm (ALG) and a variable filter (FIL) whose filter coefficients are determined (repeatedly updated) by the adaptive algorithm (ALG) in dependence of the error signal (e(n)) and the reference signal (here the processed signal (u(n)). For example, the error signal (e(n)) is the feedback corrected input signal, such as the electric input signal (y(n)) from the microphone (M) minus the feedback estimate (v'(n)) provided by the variable filter (FIL) in dependence of the processed signal (u(n)). The signal processing unit (PRO) may comprise an open loop transfer function estimator (OLTFE) according to the present disclosure, as e.g., described in FIG. 2A. The open loop transfer function estimator (OLTFE) may form part of the processor or be a separate unit (as in FIG. 2A).

Single-Channel Hearing Aid Comprising a Feedback Cancellation System Operating in a Training Mode of Operation:

The single hearing aid system comprising the feedback cancellation system, such as hearing aid of FIG. 1B, may be seen as a hearing aid operating in a training mode of operation. In other words, simulation data may be provided by a computer simulation simulating such hearing aid in a known, simulated acoustic environment (e.g., modelling real-word conditions or environments). The ML prediction model for use in the open loop transfer function estimator (OLTFE) when the hearing aid is operating in a normal mode of operation may be trained using the simulation data from the known, simulated acoustic environment. For example, in the training mode of operation, weights of the ML prediction model may be updated based on the simulation data.

For example, the simulation data comprises the feedback corrected input signal, the processed output signal, the feedback path transfer function, and the estimate of the feedback path transfer function.

For example, the feedback corrected input signal (e(n)) is indicative of a signal with reduced or cancelled acoustic or mechanical or electrical feedback, the acoustic or mechanical or electrical feedback originating from the feedback path. The electric input signal (y(n)) (e.g., representative of sound from the known, simulated acoustic environment of the hearing aid) may comprise such acoustic or mechanical or electrical feedback originating from the feedback path, thereby having the feedback corrected input signal determined based on the electric input signal. For example, the processed output signal (u(n)) is indicative of the applied frequency- and/or level-dependent gain function ($\underline{g}$(n)) to the feedback corrected input signal. The simulation data may comprise the frequency- and/or level-dependent gain function ($\underline{g}$(n)). Optionally, the frequency- and/or level-dependent gain function ($\underline{g}$(n)) may be inferred from the feedback corrected input signal together with the processed output signal. For example, the feedback path transfer function ($\underline{h}$(n)) is representative of an impulse response of the feedback path (FBP) of the hearing aid. For example, the estimate ($\underline{h}$'(n)) of the feedback path transfer function ($\underline{h}$(n)) is representative of an estimate of the impulse response of the feedback path (FBP) of the hearing aid.

A target open loop transfer function ($\xi_{Targ}(\omega,n)$ of FIG. 7) may be used to train the prediction model. For example, the target open loop transfer function can be determined based on the frequency- and/or level-dependent gain function, the feedback path transfer function, and the estimate of the feedback path transfer function.

The target open loop transfer function may be determined as, $$\xi_{Targ}(\omega, n) = G(\omega, n) \cdot (H(\omega, n) - H'(\omega, n)), \quad (2)$$

where G(ω,n) denotes a frequency response of the frequency- and/or level-dependent gain function $\underline{g}$(n) at time index n, H(ω,n) denotes a frequency response of the feedback path transfer function $\underline{h}$(n) at time index n, H'(ω,n) denotes a frequency response of the estimate of the feedback path transfer function at time index n, w denotes frequency, and (·) denotes a product operator.

The target open loop transfer function ($\hat{\xi}_{Targ}(\omega,n)$ of FIG. 7), in particular its magnitude $\hat{\xi}_{Targ,\ M}(\omega,n)$ and phase $\hat{\xi}_{Targ,P}(\omega,n)$ may be computed according to equation (2).

A training open loop transfer function may be used to train the prediction model. For example, the training open loop transfer function can be determined based on the feedback corrected input signal (e(n)), the processed output signal (u(n)), and the frequency- and/or level-dependent gain function ($\underline{g}$(n)).

For example, the ML prediction model is configured to receive as input the simulation data and provide as output the training open loop transfer function.

For example, the system of FIG. 1B can, in the training mode of operation, comprise an open loop transfer function estimator (OLTFE) comprising the ML prediction model configured to provide the training open loop transfer function ($\hat{\xi}_{Train}(\omega,n)$) of FIG. 7 (e.g., a training open-loop magnitude ($\hat{\xi}_{Train,M}(\omega,n)$) and a training open-loop phase ($\hat{\xi}_{Train,P}(w),n)$) in dependence of the simulation data.

Single-Channel Hearing Aid Comprising a Feedback Cancellation System Operating in a Normal Mode of Operation:

The single-channel hearing aid system comprising the feedback cancellation system, such as hearing aid of FIG. 1B, may be seen as a hearing aid operating in a normal mode of operation. In other words, the open loop transfer function estimator (OLTFE) of the hearing aid may comprise a trained ML prediction model (e.g., weights of the ML prediction model may be fixed) and ready to be deployed in the hearing aid.

For example, the open loop transfer function estimator (OLTFE) comprises a trained ML prediction model configured to estimate an open loop transfer function ($\xi'(\omega,n)$) in dependence of test data from real acoustic environments (e.g., situations), such as sound of an environment of the hearing aid. For example, the open loop transfer function estimator (OLTFE) receives as inputs the feedback corrected input signal (e(n)) and the processed signal (u(n)), and provides as outputs the estimated open loop transfer function ($\xi'(\omega,n)$) (e.g., an estimated open-loop magnitude ($\xi'_M(\omega,n)$) and an estimated open-loop phase ($\xi'_p(\omega,n)$)). The open loop transfer function estimator (OLTFE) may be comprised in the signal processing unit (PRO) or in communication with the signal processing unit (PRO) (e.g., as illustrated in FIG. 1A). The estimated open loop transfer function ($\xi'(\omega,n)$) (e.g., an estimated open-loop magnitude ($\xi'_M(\omega,n)$) and an estimated open-loop phase ($\xi'_p(\omega,n)$)) may be used to modify (e.g., adjust, update) the frequency- and/or level-dependent gain function ($\underline{g}$(n)) of the signal processing unit (PRO). If, e.g., the open-loop magnitude is getting close to or exceeding 1 (0 dB), and/or the open-loop phase is getting close to 0 degrees at some frequencies ω, i.e., a positive feedback is likely to appear, the frequency- and/or level-dependent gain function $\underline{g}$(n) may be changed so that its amplification at these frequencies ω will be reduced.

In other words, the frequency- and/or level-dependent gain function ($\underline{g}$(n)) may be modified when the open-loop magnitude is getting close to or exceeding 1 (0 dB), and/or the open-loop phase is getting close to 0 degrees at some frequencies ω. For example, the frequency- and/or level-dependent gain function ($\underline{g}$(n)) can be modified upon estimating the open-loop magnitude as getting close to or exceeding 1 (0 dB), and/or the open-loop phase as getting close to 0 degrees at some frequencies ω.

Optionally, the frequency- and/or level-dependent gain function ($\underline{g}$(n)) may be modified when the estimated open-loop magnitude approximately is approximately equal or greater to a magnitude threshold (e.g., not necessarily 0 dB) at some frequencies. For example, the frequency- and/or level-dependent gain function ($\underline{g}$(n)) may be modified when the estimated open-loop phase the open-loop phase is approximately meets a threshold phase (e.g., not necessarily 0 degrees) at some frequencies.

For example, the frequency- and/or level-dependent gain function ($\underline{g}$(n)) may be modified when the estimated open-loop magnitude is approximately equal to 0 dB. Optionally, the frequency- and/or level-dependent gain function ($\underline{g}$(n)) may be modified when the estimated open-loop magnitude is within a magnitude range comprising a lower range limit and an upper range limit. The lower range limit of the magnitude range may be approximately equal to −10 dB, −6 dB, −3 dB, or 0 dB. The upper range limit of the magnitude range may be approximately equal to +3 dB, +6 dB, +10 dB, or values greater than +10 dB. A magnitude range can include the following ranges: [−10 dB, +3 dB], [−10 dB, +6 dB], [−10 dB, +10 dB], [−10 dB, >+10 dB], [−6 dB, +3 dB], [−6 dB, +6 dB], [−6 dB, +10 dB], [−10 dB, >+10 dB], [−3 dB, +3 dB], [−3 dB, +6 dB], [−3 dB, +10 dB], [−3 dB, >+10 dB], [0 dB, +3 dB], [0 dB, +6 dB], [0 dB, +10 dB], [0 dB, >+10 dB]. For example, ">+10 dB" can be seen as a value greater than 10 dB. For example, the magnitude range can include a range of [−20 dB, 0 dB].

For example, the frequency- and/or level-dependent gain function ($\underline{g}$(n)) may be modified when the estimated open-loop phase is approximately equal to 0 degrees. Optionally, the frequency- and/or level-dependent gain function ($\underline{g}$(n)) may be modified when the estimated open-loop magnitude is within a phase range. For example, the phase range can include the following ranges: [−180 degrees, +180 degrees], [−30 degrees, +30 degrees], [−60 degrees, 60 degrees], [−60 degrees, 30 degrees], and [−30 degrees, 60 degrees].

For example, the modification in the frequency- and/or level-dependent gain function ($\underline{g}$(n)) can be different over frequencies (e.g., as $\underline{g}$(n) is a frequency dependent function).

For example, the open loop transfer function ($\xi'(\omega,n)$) (e.g., the open-loop magnitude ($\xi'_M(\omega,n)$) and the open-loop phase ($\xi'_p(\omega,n)$)) can be estimated using the methods described in EP3291581A2, or they can be determined using a machine learning based approach, as described throughout the present disclosure (e.g., also described in the following).

In a simulation setup and/or during a training mode of operation, feedback path transfer function ($\underline{h}$(n)) (e.g., an impulse response of a feedback path (FBP) of the hearing aid) is known, in contrast to a practical situation, such as a real acoustic environment (e.g., hence, it is possible to compute $\xi(\omega,n)$ in simulations (e.g., in computer simulation).

The idea is then to create many simulation scenarios, e.g., with different feedback paths $\underline{h}$(n), different frequency- and/or level-dependent gain functions $\underline{g}$(n), and different input signals x(n) to the hearing aid. More specifically, the frequency- and/or level-dependent gain function (e.g., a forward path gain function) $\underline{g}$(n) includes possible noise reduction, directionality (e.g., for multi-channel systems), hearing loss compensation schemes, and gain controlling algorithms, etc.

For all these above-mentioned simulation scenarios and their combinations, the adaptive filter operates as usual to compensate the simulated acoustic feedback originating from the feedback path.

Figure 2A:
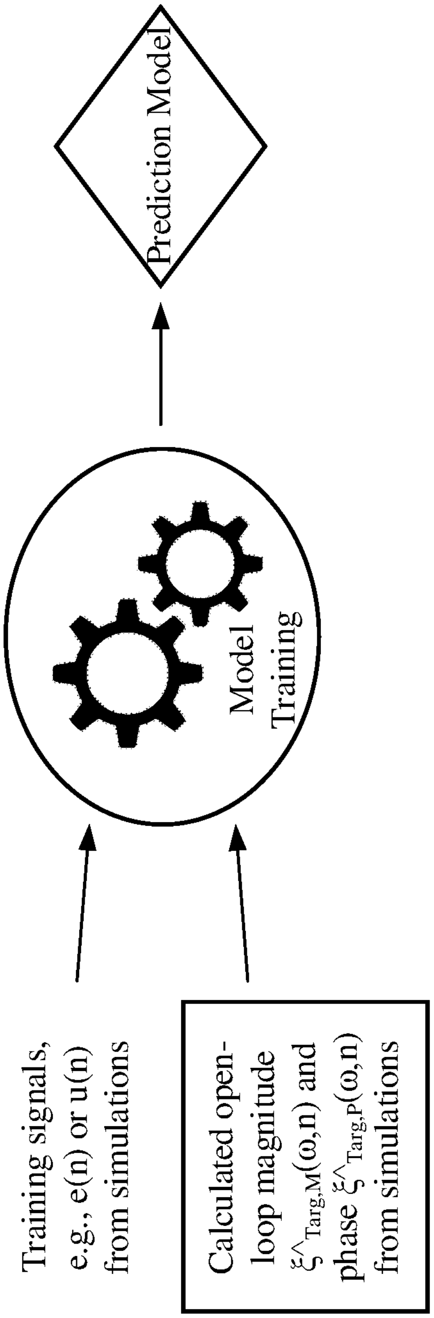
FIG. 2A shows a machine learning framework to train and predict open-loop magnitude and phase of an open loop transfer function estimator.

A machine learning training framework is used as depicted in FIG. 2A. FIG. 7 illustrates an example structure of an ML prediction model, e.g., following the machine learning training framework illustrated by FIG. 2A.

Figure 2B:
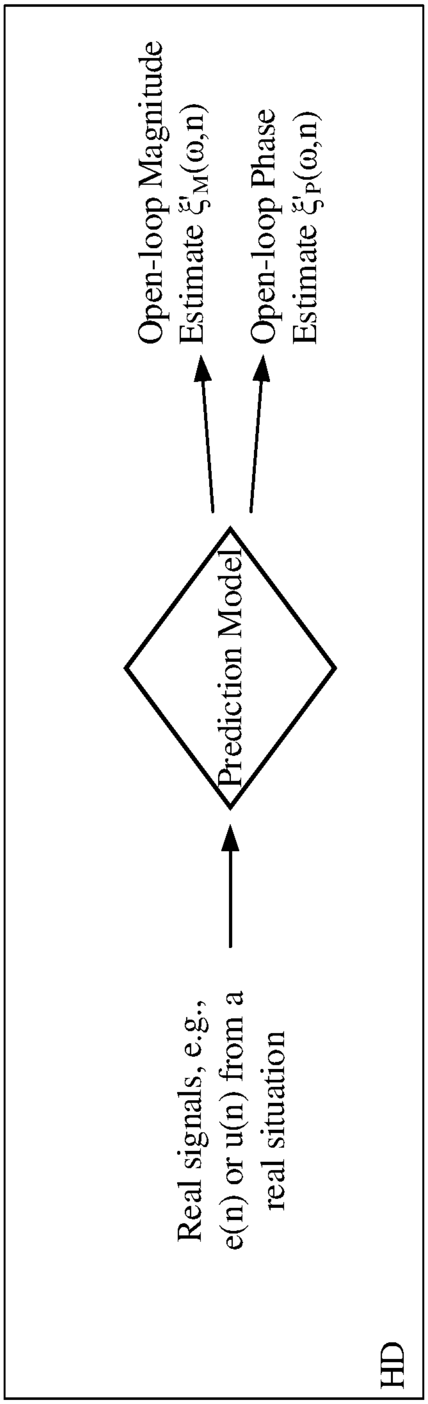
FIG. 2B shows a hearing aid comprising an open loop transfer function estimator as trained according to FIG. 2A.

FIG. 2A shows a machine learning framework to train and predict open-loop magnitude and phase of an open loop transfer function estimator; whereas FIG. 2B shows a hearing aid comprising an open loop transfer function estimator as trained (e.g., a trained ML prediction model) according to FIG. 2A.

For example, the open loop transfer function estimator comprises a ML prediction model. In other words, open loop transfer function estimator may comprise the ML prediction model. FIG. 2A illustrates a training mode of operation. FIG. 2B illustrates a normal mode of operation.

The training and test signals are given as e(n) or u(n) in FIG. 2A.

A calculated open loop transfer function (e.g., comprising a calculated open loop magnitude and a calculated open loop magnitude) may be seen as target open loop transfer function (e.g., comprising a target open loop magnitude and a target open loop magnitude), such as determined according to equations (1), (2) (e.g., or (3)).

A training signal may be construed as a signal used for training the ML prediction model, e.g., to determine the training open loop transfer function. For example, the ML prediction model may be trained using a feedback corrected input signal (e(n)) and a processed signal (u(n)) (e.g., as described with reference to FIG. 1B). Optionally, the ML prediction model may be trained using an electric input signal (y(n)) and a processed output signal (u(n)) (e.g., as described with reference to FIG. 1A), which is not explicitly shown in FIG. 2A, however a possible scenario.

For example, the training open loop transfer function can be determined based on the electric input signal (y(n)) and the frequency- and/or level-dependent gain function (g(n)). For example, the training open loop transfer function can be determined based on the feedback corrected input signal (e(n)) and the frequency- and/or level-dependent gain function (g(n)). For example, the training open loop transfer function can be determined based on the processed output signal (u(n)) and the frequency- and/or level-dependent gain function (g(n)). For example, the training open loop transfer function can be determined based on the electric input signal (y(n)) or the feedback corrected input signal (e(n)) or the processed output signal (u(n)), e.g., without the frequency- and/or level-dependent gain function (g(n)), when the ML prediction model has memory over time (e.g., the memory of the ML prediction model comprises the training signals used for training the ML prediction model at previous training iterations). The ML prediction model may comprise layers with memory of previous training signals allowing training of the ML prediction model using the electric input signal (y(n)), the processed output signal (u(n)), or the feedback corrected input signal (e(n)). Hence, any signal between the microphone and the receiver (SPK) can be used for training the ML prediction (for any hearing system of FIG. 1A-3).

A test signal may be construed as a signal used during the normal mode of operation of a hearing aid, such as to be applied to the trained ML prediction model for provision of an estimate of an open loop transfer function. For example, the trained ML prediction model may receive as input a feedback corrected input signal (e(n)) and a processed signal (u(n)), e.g., signals from real acoustic environments (e.g., as described with reference to FIG. 1B). For example, the trained ML prediction model may receive as input an electric input signal (y(n)) and a processed signal (u(n)) (e.g., as described with reference to FIG. 1A), which is not explicitly shown in FIG. 2B, however a possible scenario.

Based on the trained ML prediction model, open-loop magnitude and phase estimates $\xi'_M(\omega,n)$ and $\xi'_p(\omega,n)$ are obtained using (test) signals from real situations (e.g., environments), e.g., the feedback corrected signal e(n) or the processed signal u(n). For example, the open-loop magnitude and phase estimates $\xi'_M(\omega,n)$ and $\xi'_p(\omega,n)$ of FIG. 2B are similar to estimated open-loop magnitude ($\xi_M(\omega,n)$) and estimated open-loop phase ($\xi_p(\omega,n)$) of FIG. 1A. For example, the calculated open-loop magnitude and phase estimates $\xi\wedge_{Targ,M}(\omega,n)$ and $\xi\wedge_{Targ,P}(\omega,n)$ of FIG. 2A are similar to target open-loop magnitude $\hat{\xi}_{Targ,M}(\omega,n)$ and target open-loop phase ($\hat{\xi}_{Targ,P}(\omega,n)$) of FIG. 7.

Furthermore, the same training and prediction framework can also be used for multi-channel hearing aids, the only difference is on the calculation (e.g., estimation) of the open loop transfer function $\xi(\omega,n)$, which is different.

FIG. 2B shows a hearing aid (HD) comprising an open loop transfer function estimator as trained according to FIG. 2A in that the ML prediction model of the hearing aid is the ML prediction model trained based on simulation data from known, simulated acoustic environments. The trained ML prediction model forms part of an open loop transfer function estimator (cf. OLTFE in FIG. 1A) for providing an estimate the open-loop magnitude ($\xi'_M(\omega,n)$) and the open-loop phase ($\xi'_p(\omega,n)$) of the hearing aid in dependence of the (real, unsimulated) signals of the hearing aid, e.g., e(n) and u(n) from a real situation (and the currently applied gain function $\underline{g}(n)$), or y(n) and u(n) from a real situation (and the currently applied gain function $\underline{g}(n)$), or any of e(n), u(n), and y(n) from a real situation (and the currently applied gain function $\underline{g}(n)$).

The trained ML prediction model may be represented by (optimized) parameters of an artificial neural network, e.g., a recurrent neural network (e.g., comprising one or more layers comprising a gated recurrent unit (GRU), see e.g., EP4033784A1).

Figure 3:
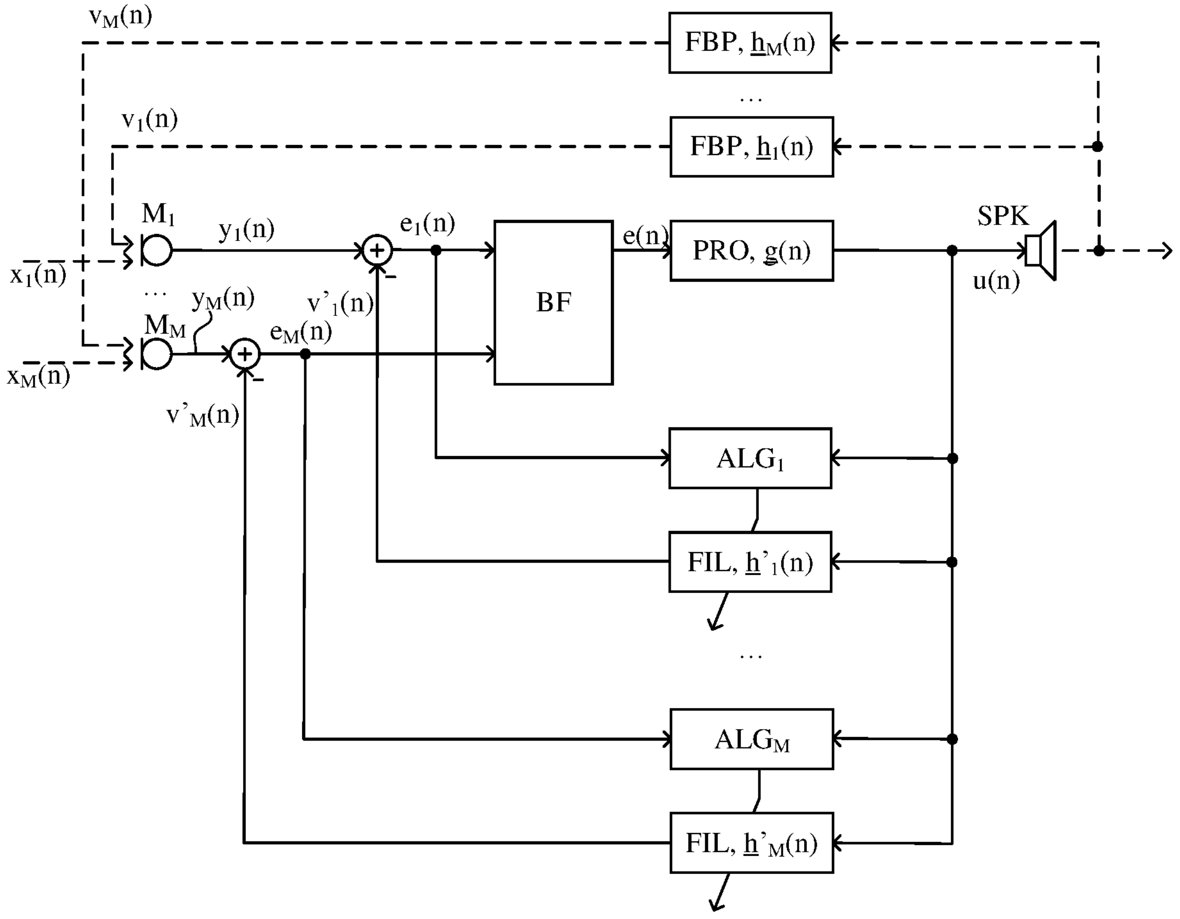
FIG. 3 shows an example multi-channel hearing system, FIG. 4 schematically shows a RITE-style embodiment of a hearing aid according to the present disclosure.

An example multi-channel hearing system is shown in FIG. 3, where a directional system processes the M microphone signals before a single-channel signal is obtained and further processed by the gain function $\underline{g}(n)$.

FIG. 3 shows an example multi-channel hearing system. FIG. 3 is similar to FIG. 1B, but instead of one input transducer the embodiment of FIG. 3 comprises a multitude (M) of input transducers (e.g., microphones $M_1, \ldots, M_M$) each experiencing its own feedback path (FBP) from the output transducer (SPK) to the input transducer in question. A multitude of feedback path transfer functions ($\underline{h}_1(n), \ldots \underline{h}_M(n)$) may be representative of an impulse response of a corresponding feedback path (FBP) of the multi-channel hearing aid system. A multi-channel hearing system may be seen as a hearing aid comprising a multi-channel hearing system. A separate adaptive filter (ALG, FIL, $h'_1(n), \ldots,$ ALG, FIL, $\underline{h}'_M(n)$) for feedback estimation is implemented for each of the M input transducers (feedback paths).

Multi-Channel Hearing System Operating in a Training Mode of Operation:

The multi-channel hearing system without the feedback cancellation system may be seen as a hearing aid operating in a training mode of operation. In other words, simulation data may be provided by a computer simulation simulating the hearing aid system in a known, simulated acoustic environment (e.g., modelling real-word conditions or environments). The ML prediction model for use in the open loop transfer function estimator (OLTFE) when the hearing aid is operating in a normal mode of operation may be trained using the simulation data from the known, simulated acoustic environment. For example, in the training mode of operation, weights of the ML prediction model may be updated based on the simulation data.

For example, the simulation data comprises a spatially filtered signal (e(n)), the processed signal, the multitude of feedback path transfer functions (($h_1(n)$, . . . , $h_M(n)$), an estimate (($h'_1(n)$, . . . , $h'_M(n)$)) of each of the multitude of feedback path transfer functions, and the beamformer filter. For example, the spatially filtered signal (e(n)) indicative of an applied beamformer filter (BF) to a multitude of signals ($e_1(n)$, . . . , $e_M(n)$) depending on a multitude of electric input signals ($y_1(n)$, . . . , $y_M(n)$). The multitude of signals ($e_1(n)$, . . . , $e_M(n)$) depending on a multitude of electric input signals ($y_1(n)$, . . . , $y_M(n)$) may be a multitude of feedback corrected input signals, as explained in FIG. 1B for a single-channel hearing aid system. For example, each of the multitude electric input signals is representative of sound from the known, simulated acoustic environment of the hearing aid. For example, the processed output signal (u(n)) is indicative of the applied frequency- and/or level-dependent gain function (g(n)) to the spatially filtered signal (e(n)). The simulation data may comprise the frequency- and/or level-dependent gain function (g(n)). Optionally, the frequency- and/or level-dependent gain function (g(n)) may be inferred from the processed output signal (u(n)). For example, each of the multitude of feedback path transfer functions is representative of an impulse response of a corresponding feedback path (FBP) of the hearing aid.

Optionally, the spatially filtered signal (e(n)) can be indicative of an applied beamformer filter (BF) to the multitude of electric input signals ($y_1(n)$, . . . , y(n)), such as for a multi-channel hearing system without a feedback cancellation system.

For example, the spatially filtered signal (e(n)) can be indicative of an applied beamformer filter (BF) to a multitude of feedback input signals ($e_1(n)$, . . . , $e_M(n)$), such as for a multi-channel hearing system comprising a feedback cancellation system.

A target open loop transfer function ($\hat{\xi}_{Targ}(\omega,n)$ of FIG. 7) may be used to train the prediction model. For example, the target open loop transfer function can be determined based on the frequency- and/or level-dependent gain function, the multitude of feedback path transfer functions, and a multitude of estimates, each of the multitude of estimates being an estimate of a corresponding feedback path transfer function of the multitude of feedback path transfer functions.

The target open loop transfer function may be determined as, $$\xi_{Targ}(\omega, n) = G(\omega, n) \cdot \sum m\, B_m(\omega, n) \cdot (H_m(\omega, n) - H'_m(\omega, n)), \qquad (3)$$

where G(ω,n) denotes a frequency response of the frequency- and/or level-dependent gain function g(n) at time index n, $H_m(\omega,n)$ denotes a frequency response of (e.g., for) each of the multitude of feedback path transfer functions at time index n, $H'_m(\omega,n)$ is a frequency response of the estimate of each of the multitude of feedback path transfer functions at time index n, $B_m(\omega,n)$ denotes a frequency response of the beamformer filter for each input transducer channel of a multitude of input transducer channels (e.g., for each electric input signals or each feedback corrected input signal) at time index n, ω denotes frequency, and (·) denotes a product operator.

For example, $H_m(\omega,n)$ may denote the frequency response of the m-th feedback path transfer function, with m=1, . . . , M. For example, $H'_m(\omega,n)$ may denote the frequency response of the estimate of the m-th feedback path transfer function, with m=1, . . . , M. For example, $B_m(\omega,n)$ denotes the m-th frequency response of the beamformer filter, e.g., for the m-th input transducer channel (e.g., for the m-th electric input signal of the multitude of electric input signals or the m-th feedback corrected input signal of the multitude of electric input signals).

A training open loop transfer function may be used to train the prediction model. For example, the training open loop transfer function can be determined based on the spatially filtered signal (e(n)), the processed output signal (u(n)), and the frequency- and/or level-dependent gain function (g(n)).

For example, the ML prediction model is configured to receive as input the simulation data and provide as output the training open loop transfer function.

For example, the system of FIG. 1A can, in the training mode of operation, comprise an open loop transfer function estimator (OLTFE) comprising the ML prediction model configured to provide the training open loop transfer function ($\hat{\xi}_{Train}(\omega,n)$) of FIG. 7 (e.g., a training open-loop magnitude ($\hat{\xi}_{Train,M}(\omega,n)$) and a training open-loop phase ($\hat{\xi}_{Train,P}(\omega,n)$) in dependence of the simulation data.

The target open loop transfer function ($\hat{\xi}_{Targ}(\omega,n)$ of FIG. 7), in particular its magnitude $\hat{\xi}_{Targ,M}(\omega,n)$ and phase $\hat{\xi}_{Targ,P}(\omega,n)$ may be computed according to equation (3). For example, a target open loop transfer function may be also termed as a true open loop transfer function or a reference open loop transfer function.

Multi-Channel Hearing System Operating in a Normal Mode of Operation:

The multi-channel hearing system may be seen as a hearing system operating in a normal mode of operation. In other words, the open loop transfer function estimator (OLTFE) of the hearing aid comprising the multi-channel hearing system may comprise a trained ML prediction model (e.g., weights of the ML prediction model may be fixed) and ready to be deployed in the hearing aid.

The embodiment of a hearing aid comprising the multi-channel hearing system of FIG. 3 (e.g., the processor (PRO) or the feedback control system) may comprise an open loop transfer function estimator (OLTFE) according to the present disclosure, as e.g., described in FIG. 2A.

The open loop transfer function estimator (OLTFE) comprising a trained ML prediction model configured to estimate an open loop transfer function ($\xi'(\omega,n)$) in dependence of test data from real acoustic environments (e.g., situations), such as sound of an environment of the hearing aid. For example, the open loop transfer function estimator (OLTFE) receives as inputs the spatially filtered signal (e(n)) and the processed signal (u(n)), and provides as outputs the estimated open loop transfer function ($\xi'(\omega,n)$) (e.g., an estimated open-loop magnitude ($\xi'_M(\omega,n)$) and an estimated open-loop phase ($\xi'_p(\omega,n)$)). The estimated open loop transfer function ($\xi'(\omega,n)$) (e.g., an estimated open-loop magnitude ($\xi'_M(\omega,n)$) and an estimated open-loop phase ($\xi'_p(\omega,n)$)) may be used to modify (e.g., adjust, update) the frequency- and/or level-dependent gain function (g(n)) of the signal processing unit (PRO). If, e.g., the open-loop magnitude is getting close to or exceeding 1 (0 dB), and/or the open-loop phase is getting close to 0 degrees at some frequencies ω, i.e., a positive feedback is likely to appear, the frequency- and/or level-dependent gain function g(n) may be changed so that its amplification at these frequencies ω will be reduced.

In other words, the frequency- and/or level-dependent gain function ($\underline{g}(n)$) may be modified when the open-loop magnitude is getting close to or exceeding 1 (0 dB), and/or the open-loop phase is getting close to 0 degrees at some frequencies ω. For example, the frequency- and/or level-dependent gain function ($\underline{g}(n)$) can be modified upon estimating the open-loop magnitude as getting close to or exceeding 1 (0 dB), and/or the open-loop phase as getting close to 0 degrees at some frequencies ω.

Optionally, the frequency- and/or level-dependent gain function ($\underline{g}(n)$) may be modified when the estimated open-loop magnitude approximately is approximately equal or greater to a magnitude threshold (e.g., not necessarily 0 dB) at some frequencies. For example, the frequency- and/or level-dependent gain function ($\underline{g}(n)$) may be modified when the estimated open-loop phase the open-loop phase is approximately meets a threshold phase (e.g., not necessarily 0 degrees) at some frequencies.

For example, the frequency- and/or level-dependent gain function ($\underline{g}(n)$) may be modified when the estimated open-loop magnitude is approximately equal to 0 dB. Optionally, the frequency- and/or level-dependent gain function ($\underline{g}(n)$) may be modified when the estimated open-loop magnitude is within a magnitude range comprising a lower range limit and an upper range limit. The lower range limit of the magnitude range may be approximately equal to −10 dB, −6 dB, −3 dB, or 0 dB. The upper range limit of the magnitude range may be approximately equal to +3 dB, +6 dB, +10 dB, or values greater than +10 dB. A magnitude range can include the following ranges: [−10 dB, +3 dB], [−10 dB, +6 dB], [−10 dB, +10 dB], [−10 dB, >+10 dB], [−6 dB, +3 dB], [−6 dB, +6 dB], [−6 dB, +10 dB], [−10 dB, >+10 dB], [−3 dB, +3 dB], [−3 dB, +6 dB], [−3 dB, +10 dB], [−3 dB, >+10 dB], [0 dB, +3 dB], [0 dB, +6 dB], [0 dB, +10 dB], [0 dB, >+10 dB]. For example, ">+10 dB" can be seen as a value greater than 10 dB. For example, the magnitude range can include a range of [−20 dB, 0 dB].

For example, the frequency- and/or level-dependent gain function ($\underline{g}(n)$) may be modified when the estimated open-loop phase is approximately equal to 0 degrees. Optionally, the frequency- and/or level-dependent gain function ($\underline{g}(n)$) may be modified when the estimated open-loop magnitude is within a phase range. For example, the phase range can include the following ranges: [−180 degrees, +180 degrees], [−30 degrees, +30 degrees], [−60 degrees, 60 degrees], [−60 degrees, 30 degrees], and [−30 degrees, 60 degrees].

For example, the modification in the frequency- and/or level-dependent gain function ($\underline{g}(n)$) can be different over frequencies (e.g., as $\underline{g}(n)$ is a frequency dependent function).

The open loop transfer function estimator (OLTFE) may form part of the processor or the of feedback control system (as in FIG. 1B) or be a separate unit (as in FIG. 1A).

Figure 4:
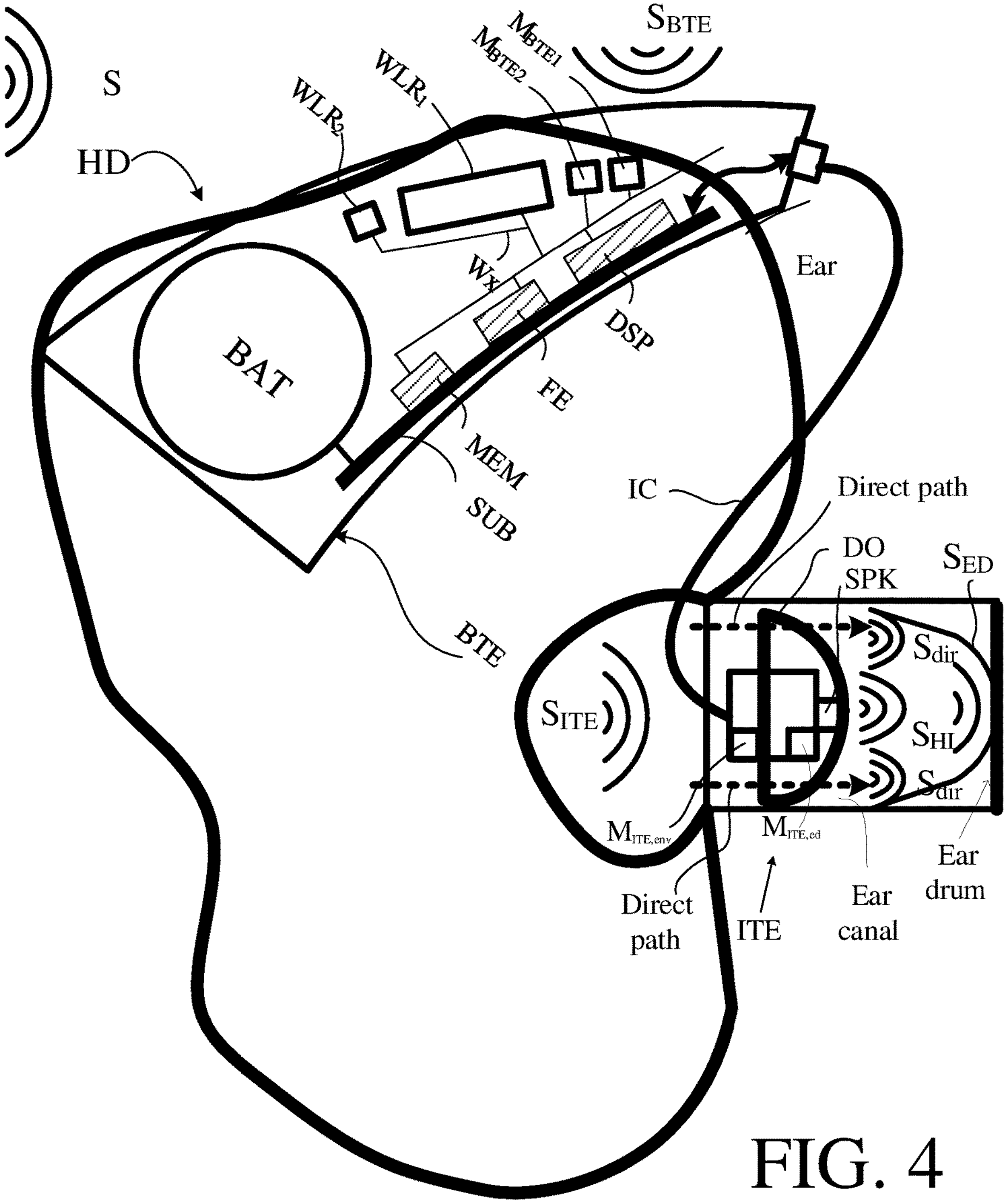

FIG. 4 shows a RITE-style embodiment of a hearing aid according to the present disclosure. FIG. 4 shows an embodiment of a hearing device (HD) according to the present disclosure. The exemplary hearing device (HD), e.g., a hearing aid, is of a particular style (sometimes termed receiver-in-the ear, or RITE, style) comprising a BTE-part (BTE) adapted for being located at or behind an ear of a user, and an ITE-part (ITE) adapted for being located in or at an ear canal of the user's ear and comprising a receiver (loudspeaker). The BTE-part and the ITE-part are connected (e.g., electrically connected) by a connecting element (IC) and internal wiring in the ITE- and BTE-parts (cf. e.g., wiring Wx in the BTE-part). The connecting element may alternatively be fully or partially constituted by a wireless link between the BTE- and ITE-parts (or by an acoustic tube, if the loudspeaker is located in the BTE-part).

In the embodiment of a hearing device in FIG. 4, the BTE part comprises an input unit comprising two (first) input transducers (e.g., microphones) ($M_{BTE1}$, $M_{BTE2}$), each for providing an (first) electric input audio signal representative of an input sound signal ($S_{BTE}$) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices, e.g., to another hearing device, or to a remote control or processing device (cf. e.g., FIG. 1C), or a telephone). The hearing device (HD) comprises a substrate (SUB) whereon a number of electronic components are mounted, including a memory (MEM), e.g., storing different hearing aid programs (e.g. parameter settings defining such programs, or parameters of algorithms) and/or hearing aid configurations, e.g., input source combinations ($M_{BTE1}$, $M_{BTE2}$, $M_{ITE,env}$, $M_{ITE,ed}$, $WLR_1$, $WLR_2$), e.g., optimized for a number of different listening situations. In a specific mode of operation, one or more directly received auxiliary electric signals may be used together with one or more of the electric input signals from the microphones to provide a beamformed signal provided by applying appropriate complex weights to (at least some of) the respective signals, e.g., to provide an enhanced target signal to the user (or an estimate of the user's own voice to another application, e.g., a communication partner, or a voice control interface).

The substrate (SUB) further comprises a configurable signal processor (DSP, e.g. a digital (audio) signal processor), e.g., including a processor for applying a frequency and level dependent gain, e.g., providing hearing loss compensation, beamforming, noise reduction, filter bank functionality, and other digital functionality of a hearing device. The configurable signal processor (DSP) is adapted to access the memory (MEM. The configurable signal processor (DSP) is further configured to process one or more of the electric input audio signals and/or one or more of the directly received auxiliary audio input signals, based on a currently selected (activated) hearing aid program/parameter setting (e.g., either automatically selected, e.g., based on one or more sensors, or selected based on inputs from a user interface). The mentioned functional units (as well as other components) may be partitioned in circuits and components according to the application in question (e.g., with a view to size, power consumption, analogue vs. digital processing, acceptable latency, etc.), e.g., integrated in one or more integrated circuits, or as a combination of one or more integrated circuits and one or more separate electronic components (e.g., inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals (e.g., interfaces to microphones and/or loudspeaker(s)). The input and output transducers may be individual separate components, or integrated (e.g., MEMS-based) with other electronic circuitry.

The hearing device (HD) further comprises an output unit (e.g., an output transducer) providing stimuli perceivable by the user as sound based on a processed audio signal from the processor or a signal derived therefrom. In the embodiment of a hearing device in FIG. 4, the ITE part comprises the output transducer in the form of a loudspeaker (also termed a 'receiver') (SPK) for converting an electric signal to an acoustic (air borne) signal, which (when the hearing device is mounted at an ear of the user) is directed towards the ear drum (Ear drum), where sound signal (SED) is provided. The ITE-part further comprises a guiding element, e.g., a dome, (DO) for guiding and positioning the ITE-part in the ear canal (Ear canal) of the user. The ITE-part may (as shown in FIG. 4) further comprise a further (first) input transducer, e.g., a microphone ($M_{ITE,env}$), facing the environment for providing an electric input audio signal representative of an input sound signal (SITE) at the ear canal. The ITE-part may (as shown in FIG. 4) further comprise a further (second) input transducer, e.g., a microphone ($M_{ITE,ed}$), facing the eardrum for providing an (second) electric input audio signal representative of the sound signal ($S_{ED}=S_{dir}+S_{HI}$) at the eardrum. Propagation of sound (SITE) from the environment to a residual volume at the ear drum via direct acoustic paths through the semi-open dome (DO) are indicated in FIG. 4 by dashed arrows (denoted Direct path). The directly propagated sound (indicated by sound fields $S_{dir}$) is mixed with sound from the hearing device (HD) (indicated by sound field SHI) to a resulting sound field (SED) at the ear drum. The sound output SHI of the hearing device may (at least in a specific mode of operation) be modified in view of the directly propagated sound from the environment to the ear drum to provide adaptive noise cancellation (ANC) and/or adaptive occlusion control (AOC).

Apart from the (acoustic) output and input transducers, the ITE part may comprise other functional components, e.g., (further) detectors, such as electrodes for picking up signals from the user's body (such as brainwave signals, temperature indications, blood-related parameters, heartbeat indications, muscular vibrations, etc.). Such detectors may include one or more of an electroencephalography (EEG) sensor, an electromyography (EMG) sensor, a movement sensor, a temperature sensor, a photoplethysmography (PPG) sensor, an electrooculography (EOG) sensor, etc.

The electric input signals (from (first and/or second) input transducers $M_{BTE1}$, $M_{BTE2}$, $M_{ITE,env}$, $M_{ITE,ed}$) may be processed in the time domain or in the (time-) frequency domain (or partly in the time domain and partly in the frequency domain as considered advantageous for the application in question).

The embodiment of a hearing device (HD), e.g., a hearing aid, exemplified in FIG. 4 are portable devices comprising a battery (BAT), e.g., a rechargeable battery, e.g., based on Li-Ion battery technology, e.g., for energizing electronic components of the BTE- and possibly ITE-parts. In an embodiment, the hearing device, e.g., a hearing aid, is adapted to provide a frequency dependent gain and/or a level dependent compression and/or a transposition (with or without frequency compression) of one or more frequency ranges to one or more other frequency ranges, e.g., to compensate for a hearing impairment of a user. The BTE-part may e.g., comprise a connector (e.g., a DAI or USB connector) for connecting a 'shoe' with added functionality (e.g., an FM-shoe or an extra battery, etc.), or a programming device, or a charger, or a separate processing device, etc., to the hearing device (HD).

Figure 5A:
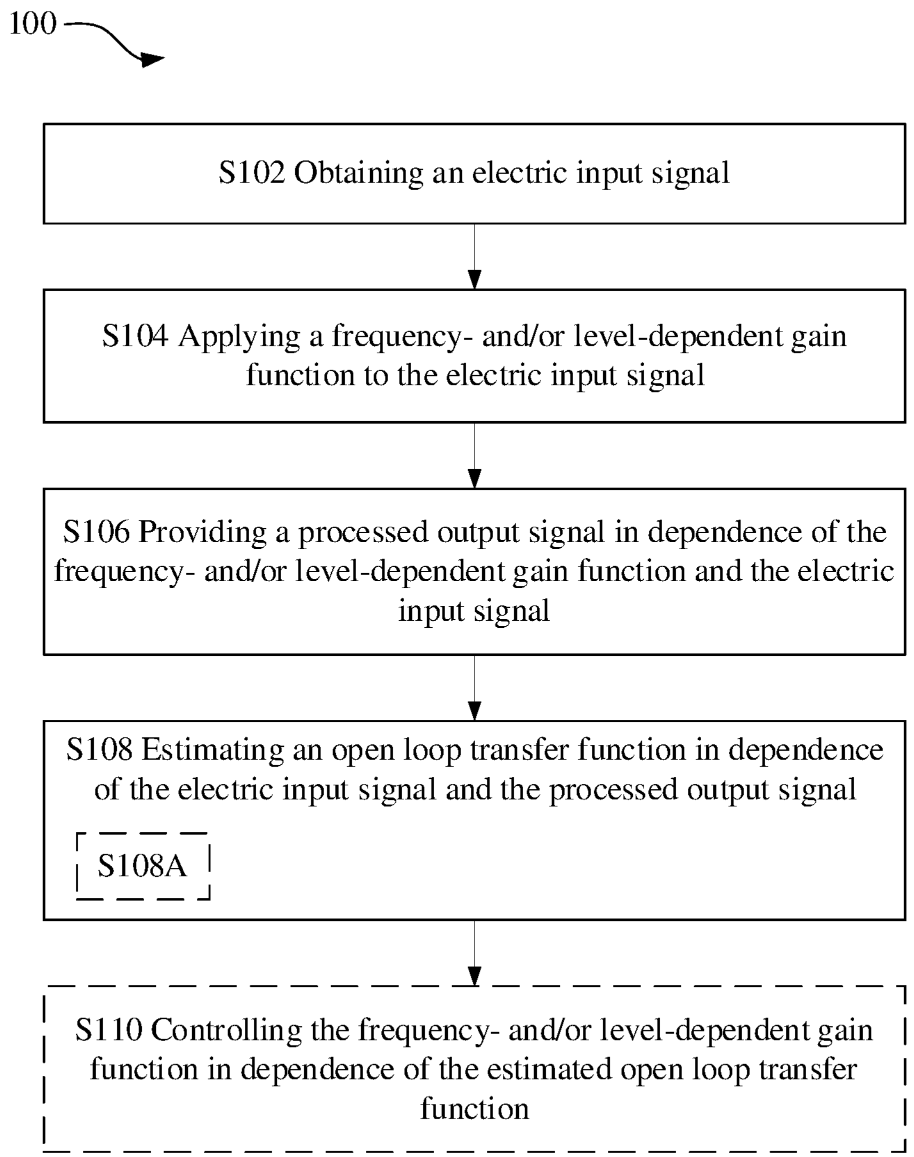
FIG. 5A shows a flow-chart illustrating an example method, performed by a hearing aid without a feedback cancellation system, for estimating an open loop transfer function, according to the present disclosure.

FIG. 5A shows a flow-chart illustrating an example method 100, performed by a hearing aid without a feedback cancellation system, for estimating an open loop transfer function according to the present disclosure. The hearing aid without a feedback cancellation system is the hearing aid disclosed herein, such as hearing aid of FIG. 1A.

The method 100 comprises obtaining S102 an electric input signal representing sound of an environment of the hearing aid. The hearing aid may obtain the electric input signal (y(n)) from an input unit of the hearing aid.

In one or more example methods, the at least one electric input signal representing sound of an environment of the hearing aid may be construed as a signal from a real acoustic environment, such as an acoustic environment where a user using the hearing aid is located at (e.g., or where the hearing aid is in use). In other words, the hearing aid may be operating in a normal mode of operation. The hearing aid may perform the method 100 while operating in a normal mode of operation.

The method 100 comprises applying S104 a frequency- and/or level-dependent gain function to the electric input signal. A signal processing unit of the hearing aid may be configured to apply such frequency- and/or level-dependent gain function to the electric input signal.

The method 100 comprises providing S106 a processed output signal in dependence of the applied frequency- and/or level-dependent gain function and the electric input signal. A signal processing unit of the hearing aid may be configured to provide the processed output signal.

The method 100 comprises estimating S108 an open loop transfer function in dependence of the electric input signal and the processed output signal. For example, the method 100 is a machine learning (ML) inference method. In other words, the estimated open loop transfer function may be an inferred (e.g., deduced) ML output. For example, estimating an open loop transfer function may comprise applying the electric input signal and the processed output signal to a trained ML model, such as a trained ML prediction model. An open loop transfer function estimator (OLTFE) of the hearing aid, the open loop transfer function estimator comprising a trained ML prediction model, may be configured to estimate the open loop transfer function. In other words, the trained ML prediction model may be configured to estimate the open loop transfer function. In one or more example methods, estimating S108 the open loop transfer function comprises applying S108A the electric input signal and the processed output signal to the trained ML prediction model. Optionally, estimating S108 the open loop transfer function comprises applying the electric input signal and the processed output signal to the open loop transfer function estimator (OLTFE) comprising the trained ML prediction model.

In one or more example methods, the estimated open loop transfer function comprises an estimated open-loop magnitude and an estimated open-loop phase. In one or more example methods, the method 100 comprises estimating the open loop magnitude and the open loop phase in dependence of (e.g., based on) the electric input signal and the processed output signal.

In one or more example methods, the method 100 comprises controlling S110 the frequency- and/or level-dependent gain function of the hearing aid in dependence of the estimated open loop transfer function (e.g., of the estimated open-loop magnitude and an estimated open-loop phase). For example, the method 100 comprises adjusting (e.g., updating) the frequency- and/or level-dependent gain function of the hearing aid based on the estimated open loop transfer function.

Figure 5B:
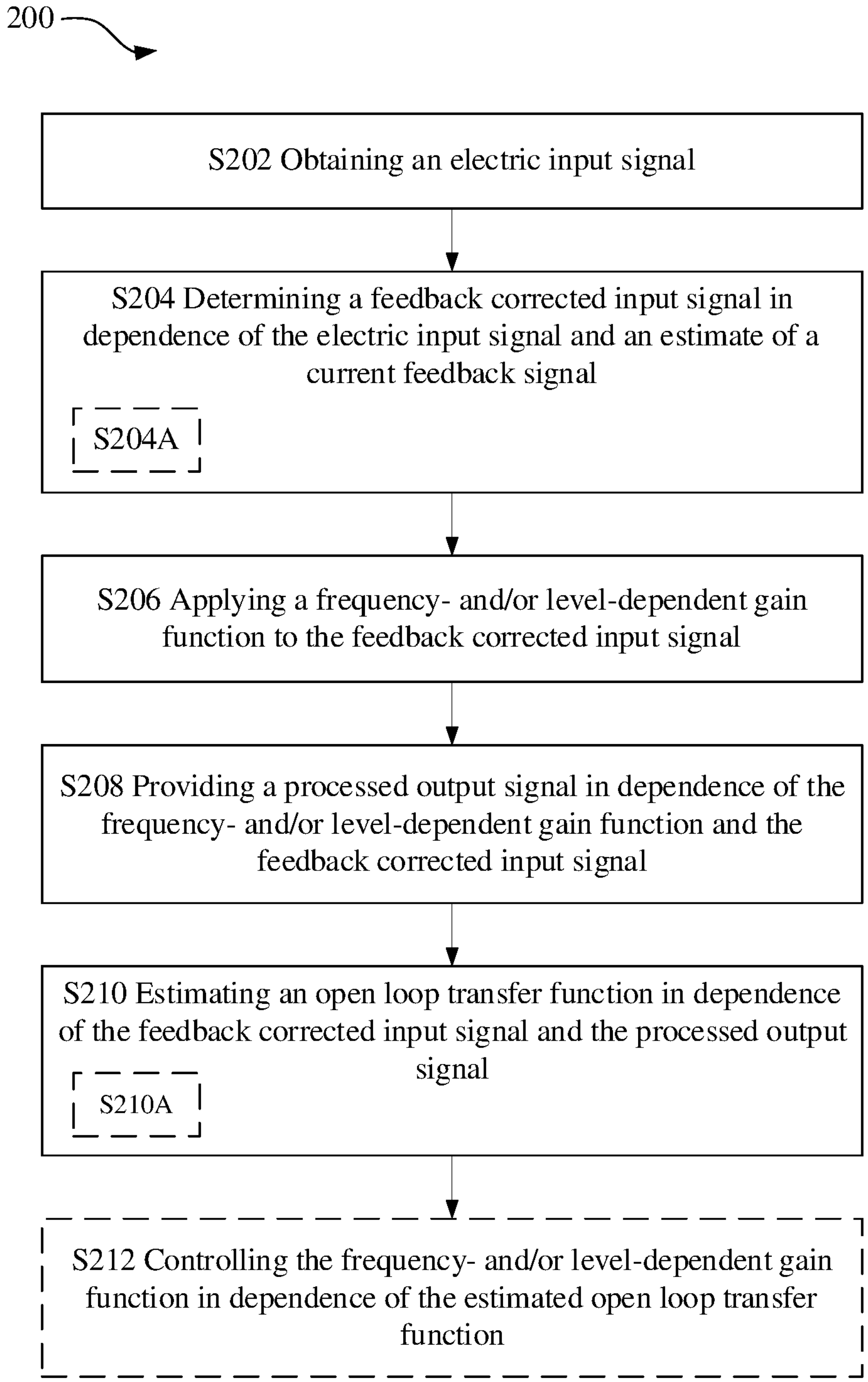
FIG. 5B shows a flow-chart illustrating an example method, performed by a hearing aid comprising a feedback cancellation system, for estimating an open loop transfer function, according to the present disclosure.

FIG. 5B shows a flow-chart illustrating an example method 200, performed by a hearing aid comprising a feedback cancellation system, for estimating an open loop transfer function, according to the present disclosure. The hearing aid comprising a feedback cancellation system is the hearing aid disclosed herein, such as hearing aid of FIG. 1B.

The method 200 comprises obtaining S202 an electric input signal representing sound of an environment of the hearing aid. The hearing aid may obtain the electric input signal from an input unit of the hearing aid.

In one or more example methods, the at least one electric input signal representing sound of an environment of the hearing aid may be construed as a signal from a real acoustic environment, such as an acoustic environment where a user using the hearing aid is located at (e.g., or where the hearing aid is in use). In other words, the hearing aid may be operating in a normal mode of operation. The hearing aid may perform the method 200 while operating in a normal mode of operation.

In one or more example methods, the method 200 comprises determining S204 a feedback corrected input signal in dependence of the electric input signal and an estimate of a current feedback signal. The feedback corrected signal may be indicative of a signal with reduced or cancelled acoustic or mechanical or electrical feedback. The acoustic or mechanical or electrical feedback may originate from a feedback path from an output transducer to an input unit of the hearing aid in the electric input signal. A feedback cancellation system of the hearing aid may be configured to determine the feedback corrected input signal.

The current feedback signal may be indicative of a feedback path transfer function. For example, the current feedback signal comprises the feedback path transfer function. The feedback path transfer function may be representative of an impulse response of a feedback path from the output transducer to the input unit in the electric input signal.

In one or more example methods, determining S204 the feedback corrected input signal comprises determining S204A the estimate of the current feedback signal based on a previously determined feedback corrected input signal and a previously determined processed signal.

The estimate of the current feedback signal may be indicative of an estimate of the feedback path transfer function. For example, the estimate of the current feedback signal comprises the estimate of the feedback path transfer function. The estimate of the feedback path transfer function may be representative of an estimate of the impulse response of the feedback path.

For example, the feedback cancellation system can comprise an adaptive filter configured to provide the estimate of the current feedback signal, e.g., to determine the estimate of the current feedback signal in dependence of the previously determined feedback corrected input signal and the previously determined processed signal. In other words, the adaptive filter may comprise an adaptive algorithm and a variable filter whose filter coefficients are determined (repeatedly updated) by the adaptive algorithm in dependence of a previously determined feedback corrected input and a previously determined processed signal. For example, the adaptive filter can be configured to provide the estimate of the feedback path transfer function.

The method 200 comprises applying S206 a frequency- and/or level-dependent gain function to the feedback corrected input signal. A signal processing unit of the hearing aid may be configured to apply such frequency- and/or level-dependent gain function to the feedback corrected input signal.

The method 200 comprises providing S208 a processed output signal in dependence of the applied frequency- and/or level-dependent gain function and the feedback corrected input signal. A signal processing unit of the hearing aid may be configured to provide the processed output signal.

The method 200 comprises estimating S210 an open loop transfer function in dependence of the feedback corrected input signal and the processed output signal. For example, the method 200 is a machine learning (ML) inference method. In other words, the estimated open loop transfer function may be an inferred (e.g., deduced) ML output. For example, estimating an open loop transfer function may comprise applying the electric input signal and the processed output signal to a trained ML model, such as a trained ML prediction model. An open loop transfer function estimator (OLTFE) of the hearing aid, the open loop transfer function estimator comprising the trained ML prediction model, may be configured to estimate the open loop transfer function. In other words, the trained ML prediction model may be configured to estimate the open loop transfer function. In one or more example methods, estimating S210 the open loop transfer function comprises applying S210A the feedback corrected input signal and the processed output signal to the trained ML prediction model. Optionally, estimating S210 the open loop transfer function comprises applying the feedback corrected input signal and the processed output signal to the open loop transfer function estimator (OLTFE) comprising the trained ML prediction model.

In one or more example methods, the estimated open loop transfer function comprises an estimated open-loop magnitude and an estimated open-loop phase. In one or more example methods, the method 200 comprises estimating the open loop magnitude and the open loop phase in dependence of (e.g., based on) the electric input signal and the processed output signal.

In one or more example methods, the method 200 comprises controlling S212 the frequency- and/or level-dependent gain function of the hearing aid in dependence of the estimated open loop transfer function (e.g., of the estimated open-loop magnitude and an estimated open-loop phase). For example, the method 200 comprises adjusting (e.g., updating) the frequency- and/or level-dependent gain function of the hearing aid based on the estimated open loop transfer function.

Figure 5C:
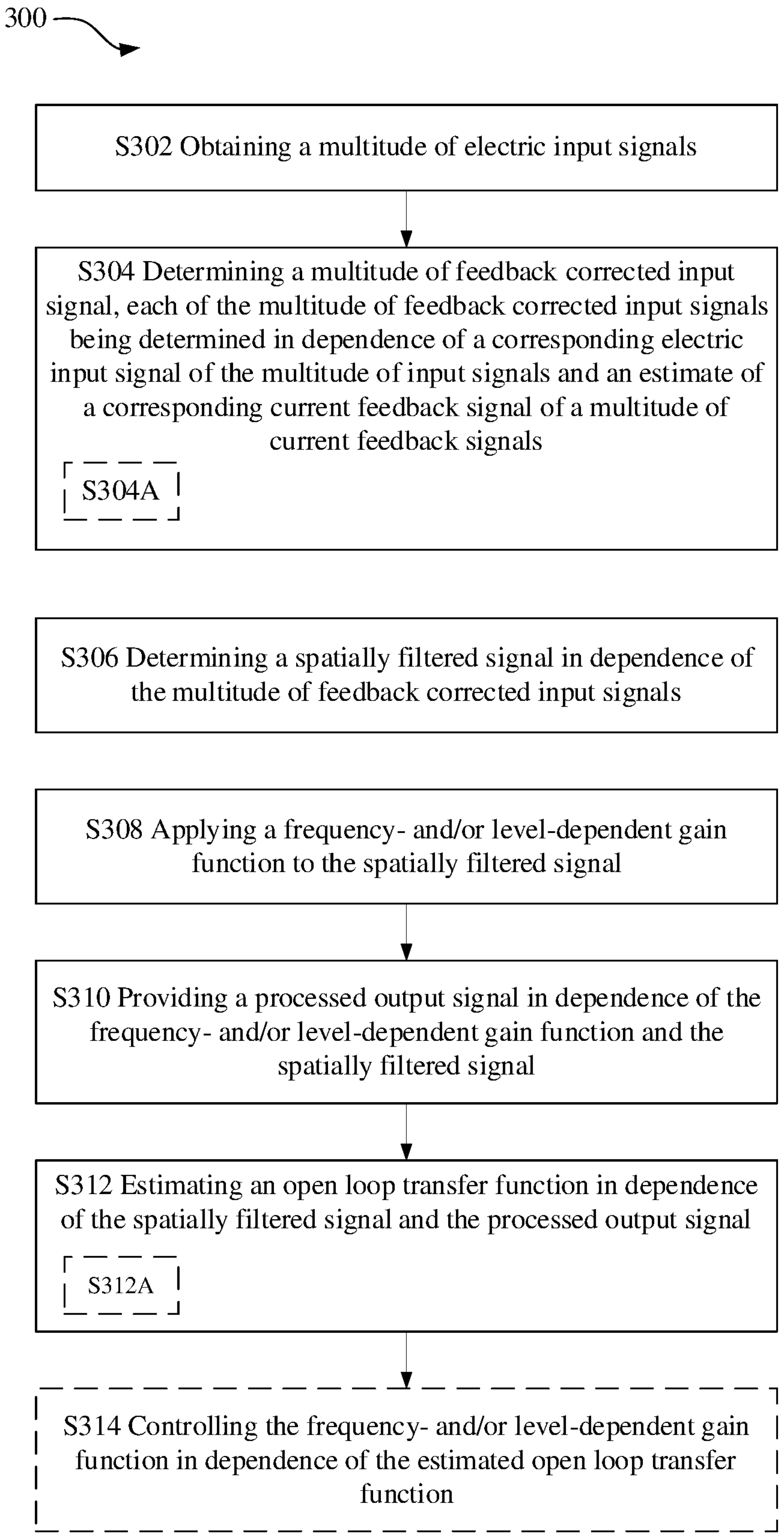
FIG. 5C shows a flow-chart illustrating an example method, performed by a hearing aid comprising a multi-channel hearing aid system, for estimating an open loop transfer function, according to the present disclosure.

FIG. 5C shows a flow-chart illustrating an example method 300, performed by a hearing aid comprising a multi-channel hearing aid system, for estimating an open loop transfer function, according to the present disclosure. The hearing aid comprising the multi-channel hearing aid system is the hearing aid disclosed herein, such as hearing aid of FIG. 3.

The method 300 comprises obtaining S302 a multitude of electric input signals representing sound of an environment of the hearing aid. The hearing aid may obtain the multitude of electric input signal from a corresponding multitude of input transducers (e.g., microphones) of the hearing aid.

In one or more example methods, each of the multitude of electric input signals representing sound of an environment of the hearing aid may be construed as a signal from a real acoustic environment, such as an acoustic environment where a user using the hearing aid is located at (e.g., or where the hearing aid is in use). In other words, the hearing aid may be operating in a normal mode of operation. The hearing aid may perform the method 300 while operating in a normal mode of operation.

For example, the method 300 comprises obtaining a first electric input signal from a first input transducer from the multitude of input transducers. For example, the method 300 comprises obtaining a second electric input signal from a second input transducer from the multitude of input transducers. For example, the method 300 comprises obtaining a third electric input signal from a third input transducer from the multitude of input transducers.

In one or more example methods, the method 300 comprises determining S304 a multitude of feedback corrected input signals, each of the multitude of feedback corrected input signals being determined in dependence of a corresponding electric input signal of the multitude of input signals and an estimate of a corresponding current feedback signal of a multitude of current feedback signals. Each of the multitude of feedback corrected signals may be indicative of a signal with reduced or cancelled acoustic or mechanical or electrical feedback. The acoustic or mechanical or electrical feedback may originate from a feedback path from an output transducer to an input unit of the hearing aid in the electric input signal. The feedback cancellation system of the hearing aid may be configured to determine the multitude of feedback corrected input signals.

Each of the multitude of current feedback signals may be indicative of a feedback path transfer function. For example, the current feedback signal comprises the feedback path transfer function. The feedback path transfer function may be representative of an impulse response of a feedback path from the output transducer to the input unit in the electric input signal.

For example, the multitude of current feedback signals comprises a first current feedback signal, a second current feedback signal, a second current, and a third feedback signal.

In one or more example methods, the method 300 comprises determining the first feedback corrected input signal. The first feedback corrected input signal may be determined in dependence of the first electric input signal and an estimate of the first current feedback signal. In one or more example methods, the method 300 comprises determining the second feedback corrected input signal. The second feedback corrected input signal may be determined in dependence of the second electric input signal and an estimate of the second current feedback signal. In one or more example methods, the method 300 comprises determining the third feedback corrected input signal. The third feedback corrected input signal may be determined in dependence of the third electric input signal and an estimate of the third current feedback signal.

In one or more example methods, determining S304 the multitude of feedback corrected input signals comprises determining S304A the estimate of each of the multitude of current feedback signals based on a corresponding previously determined feedback corrected input signal and a corresponding previously determined processed signal.

The estimate of each of the multitude of current feedback signals may be indicative of an estimate of the feedback path transfer function. For example, the estimate of each of the multitude of current feedback signals comprises the estimate of the feedback path transfer function. The estimate of the feedback path transfer function may be representative of an estimate of the impulse response of the feedback path.

For example, the feedback cancellation system can comprise a multitude of adaptive filters, each of multitude of adaptive filters configured to provide the estimate of the current feedback signal (e.g., to determine the estimate of the current feedback signal in dependence of the previously determined feedback corrected input signal and the previously determined processed signal). In other words, each of the multitude of adaptive filters may comprise an adaptive algorithm and a variable filter whose filter coefficients are determined (repeatedly updated) by the adaptive algorithm in dependence of a previously determined feedback corrected input and a previously determined processed signal. For example, each of the adaptive filter can be configured to provide the estimate of the feedback path transfer function.

In one or more example methods, the determining the first feedback corrected input signal comprises determining the estimate of the first current feedback signal based on a first previously determined feedback corrected input signal and a first previously determined processed signal. For example, a first adaptive filter of the multitude of adaptive filters can be configured to provide the estimate of the first current feedback signal. For example, the first adaptive filter can be configured to provide the estimate of the first feedback path transfer function, the first feedback path transfer function being representative of an estimate of the impulse response of a first feedback path from the output transducer to the input unit in the first electric input signal.

In one or more example methods, the determining the second feedback corrected input signal comprises determining the estimate of the second current feedback signal based on a second previously determined feedback corrected input signal and a second previously determined processed signal. For example, a second adaptive filter of the multitude of adaptive filters can be configured to provide the estimate of the second current feedback signal. For example, the second adaptive filter can be configured to provide the estimate of the second feedback path transfer function, the second feedback path transfer function being representative of an estimate of the impulse response of a second feedback path from the output transducer to the input unit in the second electric input signal.

In one or more example methods, the determining the third feedback corrected input signal comprises determining the estimate of the third current feedback signal based on a third previously determined feedback corrected input signal and a third previously determined processed signal. For example, a third adaptive filter of the multitude of adaptive filters can be configured to provide the estimate of the third current feedback signal. For example, the third adaptive filter can be configured to provide the estimate of the third feedback path transfer function, the third feedback path transfer function being representative of an estimate of the impulse response of a third feedback path from the output transducer to the input unit in the third electric input signal.

The method 300 comprises determining S306 a spatially filtered signal in dependence of the multitude of feedback corrected input signals. In other words, the method 300 may comprise applying a beamformer filter to the multitude of feedback corrected input signals. The beamformer filter of the hearing aid may be configured to determine the spatially filtered signal. In one or more example methods, the method comprises determining the spatially filtered signal in dependence of the first feedback corrected input signal, the second feedback corrected input signal, and the third feedback corrected input signal. The hearing aid may comprise a multi-hearing system, multi-hearing system comprising the feedback cancellation system.

Optionally, the method 300 comprises determining the spatially filtered signal in dependence of the multitude of electric input signals. In other words, the method 300 may comprise applying a beamformer filter to the multitude of electric input signals. In one or more example methods, the method comprises determining the spatially filtered signal in dependence of the first electric input signal, the second electric input signal, and the third electric input signal. The hearing aid may comprise a multi-hearing system without the feedback cancellation system.

The method 300 comprises applying S308 a frequency- and/or level-dependent gain function to the spatially filtered signal. A signal processing unit of the hearing aid may be configured to apply such frequency- and/or level-dependent gain function to the spatially filtered signal.

The method 300 comprises providing S310 a processed output signal in dependence of the applied frequency- and/or level-dependent gain function and the spatially filtered signal. A signal processing unit of the hearing aid may be configured to provide the processed output signal.

The method 300 comprises estimating S312 an open loop transfer function in dependence of the spatially filtered signal and the processed output signal. For example, the method 300 is a machine learning (ML) inference method. In other words, the estimated open loop transfer function may be an inferred (e.g., deduced) ML output. For example, estimating an open loop transfer function may comprise applying the spatially filtered signal and the processed output signal to a trained ML model, such as a trained ML prediction model. An open loop transfer function estimator (OLTFE) of the hearing aid, the open loop transfer function estimator comprising the trained ML prediction model, may be configured to estimate the open loop transfer function. In other words, the trained ML prediction model may be configured to estimate the open loop transfer function. In one or more example methods, estimating S312 the open loop transfer function comprises applying S312A the spatially filtered signal and the processed output signal to the trained ML prediction model. Optionally, estimating S312 the open loop transfer function comprises applying the spatially filtered signal and the processed output signal to the open loop transfer function estimator (OLTFE) comprising the trained ML prediction model.

In one or more example methods, the estimated open loop transfer function comprises an estimated open-loop magnitude and an estimated open-loop phase. In one or more example methods, the method 300 comprises estimating the open loop magnitude and the open loop phase in dependence of (e.g., based on) the spatially filtered signal and the processed output signal.

In one or more example methods, the method 300 comprises controlling S314 the frequency- and/or level-dependent gain function of the hearing aid in dependence of the estimated open loop transfer function (e.g., of the estimated open-loop magnitude and an estimated open-loop phase). For example, the method 300 comprises adjusting (e.g., updating) the frequency- and/or level-dependent gain function of the hearing aid based on the estimated open loop transfer function.

Figure 6A:
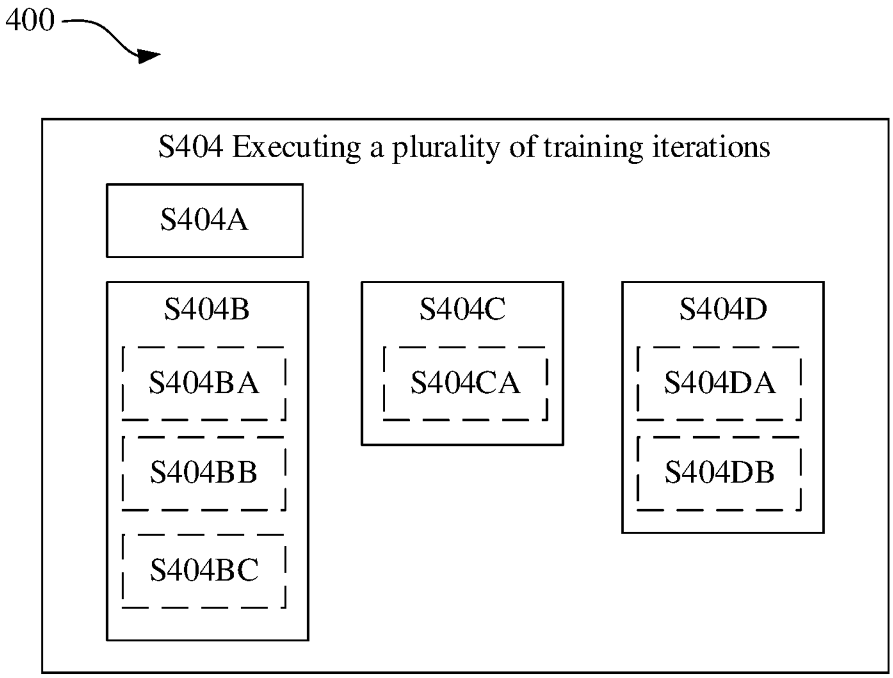
FIGS. 6A-6C show flow-charts illustrating example methods of training a ML prediction model for use in an open loop transfer function estimator of a hearing aid, according to the present disclosure, and FIG. 7 schematically illustrates an example structure of a ML prediction model according to the present disclosure.

FIG. 6A shows a flow-chart illustrating an example method 400 of training a ML prediction model for use in an open loop transfer function estimator of a hearing aid, according to the present disclosure. The hearing aid is a hearing aid without a feedback cancellation system (such as hearing aid of FIG. 1A)

The open loop transfer function estimator (OLFTE) comprises the ML prediction model.

In one or more example methods, the method 400 is performed by an external device (e.g., a computer). In other words, the method 400 may be a computer-implemented method for training a ML model (e.g., the prediction model) of a hearing device (e.g., hearing aid of FIG. 1A).

A training stage may be followed by an inference stage. In other words, the method 400 (e.g., of training the prediction model) may be followed by an inference method, such as method 100 of FIG. 6A. During the training stage, weights associated with the ML prediction model may be (continuously) updated. In the inference stage, the ML prediction model is trained (e.g., the weights may be fixed) and ready to be deployed.

The method 400 comprises executing S404 a plurality of training iterations.

Each training iteration of the plurality of training iterations comprises obtaining S404A, from the hearing aid, the simulation data.

The simulation data comprises an electric input signal, a processed output signal, and a feedback path transfer function. The electric input signal is representative of sound from a known, simulated acoustic environment of the hearing aid. The processed output signal is indicative of an applied frequency- and/or level-dependent gain function to the electric input signal. The feedback path transfer function is representative of an impulse response of a feedback path of the hearing aid.

Each training iteration of the plurality of training iterations comprises determining S404B a target open loop transfer function based on the frequency- and/or level-dependent gain function and the feedback path transfer function.

Each training iteration of the plurality of training iterations comprises determining S404C the training open loop transfer function in dependence of the electric input signal, the processed output signal, and the frequency- and/or level-dependent gain function.

For example, the ML prediction model is configured to receive as inputs the electric input signal, the processed output signal, and the frequency- and/or level-dependent gain function, and provide as output the training open loop transfer function.

Each training iteration of the plurality of training iterations comprises updating S404D the ML prediction model based on the target open loop transfer function and the training open loop transfer function.

In one or more example methods, determining S404B the target open loop transfer function comprises determining S404BA a frequency response $G(\omega,n)$ of the applied frequency- and/or level-dependent gain function.

In one or more example methods, determining S404B the target open loop transfer function comprises determining S404BB a frequency response $H(\omega,n)$ of the feedback path transfer function.

In one or more example methods, determining S404B the target open loop transfer function comprises determining S404BC the target open loop transfer function as $G(\omega,n)\cdot H(\omega,n)$, where n denotes time, w denotes frequency, and $(\cdot)$ denotes a product operator.

In one or more example methods, determining S404C the training open loop transfer function comprises providing S404CA the electric input signal and the frequency- and/or level-dependent gain function as input to the ML prediction model.

In one or more example methods, the ML prediction model comprises one or more of: a deep neural network (DNN), a convolutional neural network (CNN), and recurrent neural network (RNN).

In one or more example methods, the ML prediction model comprises a deep neural network (DNN). For example, an DNN can comprise at least two neural networks (e.g., layers). For example, an DNN can comprise one or more of: a convolutional neural network (CNN), a recurrent neural network (RNN). For example, an DNN can comprise one or more of: a convolutional-based neural network, a recurrent-based neural network. An RNN may include a gated recurrent unit (GRU).

In one or more example methods, updating S404D the ML prediction model comprises determining S404DA a training error signal in dependence of the target open loop transfer function and the training open loop transfer function.

In one or more example methods, updating S404D the ML prediction model comprises updating S404DB weights, using a learning rule, of the ML prediction model based on the training error signal.

In one or more example methods, the training open loop transfer function comprises a training open-loop magnitude and a training open-loop phase. In one or more example methods, the target open loop transfer function comprises a target open-loop magnitude and a target open-loop phase.

For example, the ML prediction model may be trained using the electric input signal, the processed signal determined from electric input signal, the frequency- and/or level-dependent gain function, and the feedback path transfer function.

Figure 6B:
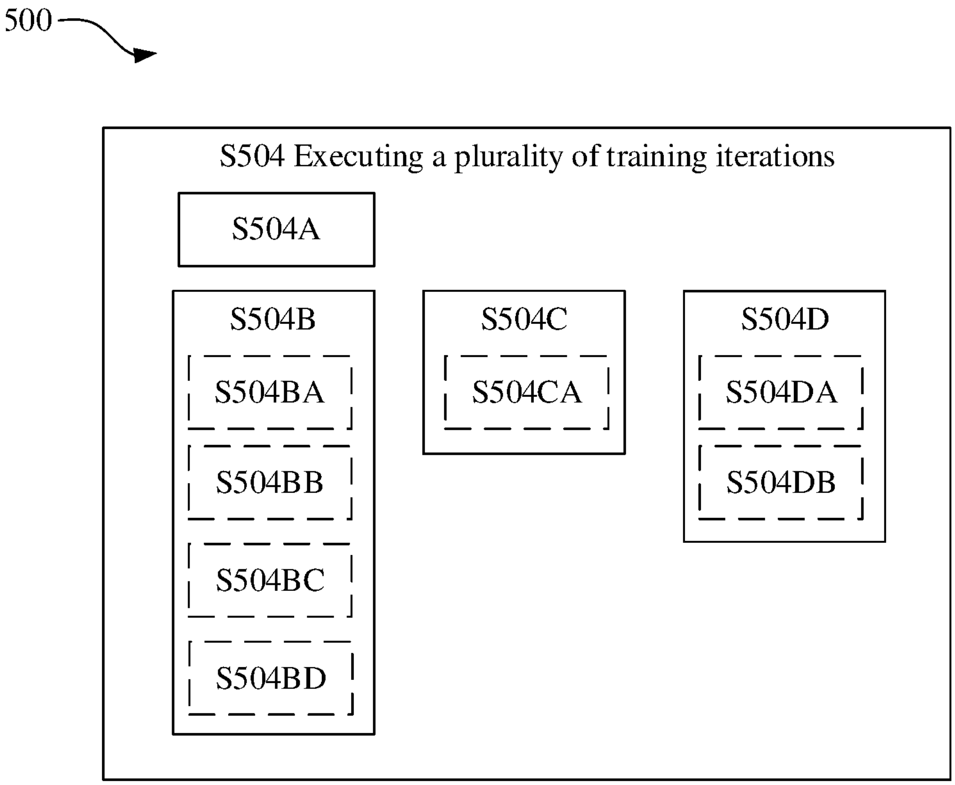

FIG. 6B shows a flow-chart illustrating an example method 500 of training a ML prediction model for use in an open loop transfer function estimator of a hearing aid, according to the present disclosure. The hearing aid is a hearing aid comprising a feedback cancellation system (such as hearing aid of FIG. 1B)

The open loop transfer function estimator (OLFTE) comprises the ML prediction model.

In one or more example methods, the method 500 is performed by an external device (e.g., a computer). In other words, the method 500 may be a computer-implemented method for training a ML model (e.g., the prediction model) of a hearing device (e.g., hearing aid of FIG. 1B).

A training stage may be followed by an inference stage. In other words, the method 500 (e.g., of training the prediction model) may be followed by an inference method, such as method 200 of FIG. 6B. During the training stage, weights associated with the ML prediction model may be (continuously) updated. In the inference stage, the ML prediction model is trained (e.g., the weights may be fixed) and ready to be deployed.

The method 500 comprises executing S504 a plurality of training iterations.

Each training iteration of the plurality of training iterations comprises obtaining S504A, from the hearing aid, the simulation data.

The simulation data comprises an electric input signal, a processed output signal, and a feedback path transfer function. The electric input signal is representative of sound from a known, simulated acoustic environment of the hearing aid. The processed output signal is indicative of an applied frequency- and/or level-dependent gain function to a signal originating from the electric input signal. The feedback path transfer function is representative of an impulse response of a feedback path of the hearing aid.

In one or more example methods, the simulation data further comprises a feedback corrected input signal and an estimate of the feedback path transfer function. In other words, the signal originating from the electric input signal may be the feedback corrected input signal. In one or more example methods, the feedback corrected input signal is indicative of a signal with reduced or cancelled acoustic or mechanical or electrical feedback, the acoustic or mechanical or electrical feedback originating from the feedback path. The electric input signal may comprise such acoustic or mechanical or electrical feedback originating from the feedback path, thereby having the feedback corrected input signal determined based on the electric input signal.

In one or more example methods, each training iteration of the plurality of training iterations comprises determining S504B the target open loop transfer function based on the frequency- and/or level-dependent gain function, the feedback path transfer function, and the estimate of the feedback path transfer function.

In one or more example methods, each training iteration of the plurality of training iterations comprises determining S504C a training open loop transfer function in dependence of the signal originating from the electric input signal (such as, the feedback corrected input signal), the processed output signal, and the frequency- and/or level-dependent gain function.

For example, the ML prediction model is configured to receive as inputs the signal originating from the electric input signal (such as, the feedback corrected input signal), the processed output signal, and the frequency- and/or level-dependent gain function, and provide as output the training open loop transfer function.

Each training iteration of the plurality of training iterations comprises updating S504D the ML prediction model based on the target open loop transfer function and the training open loop transfer function.

In one or more example methods, determining S504B the target open loop transfer function comprises determining S504BA a frequency response G(ω,n) of the applied frequency- and/or level-dependent gain function.

In one or more example methods, determining S504B the target open loop transfer function comprises determining S504BB a frequency response H(ω,n) of the feedback path transfer function.

In one or more example methods, determining S504B the target open loop transfer function comprises determining S504BC a frequency response H'(ω,n) of the estimate of the feedback path transfer function.

In one or more example methods, determining S504B the target open loop transfer function comprises determining S504BD the target open loop transfer function as $G(\omega,n)\cdot(H(\omega,n)-H'(\omega,n))$, where n denotes time, w denotes frequency, and (·) denotes a product operator.

In one or more example methods, determining S504C the training open loop transfer function comprises providing S504CA the signal originating from the electric input signal (such as, the feedback corrected input signal) and the frequency- and/or level-dependent gain function as input to the ML prediction model.

In one or more example methods, the ML prediction model comprises a deep neural network (DNN). For example, an DNN can comprise at least two neural networks (e.g., layers). For example, an DNN can comprise one or more of: a convolutional neural network (CNN), a recurrent neural network (RNN). For example, an DNN can comprise one or more of: a convolutional-based neural network, a recurrent-based neural network. An RNN may include a gated recurrent unit (GRU).

In one or more example methods, updating S504D the ML prediction model comprises determining S504DA a training error signal in dependence of the target open loop transfer function and the training open loop transfer function.

In one or more example methods, updating S504C the ML prediction model comprises updating S504DB weights, using a learning rule, of the ML prediction model based on the training error signal.

In one or more example methods, the training open loop transfer function comprises a training open-loop magnitude and a training open-loop phase. In one or more example methods, the target open loop transfer function comprises a target open-loop magnitude and a target open-loop phase.

For example, the ML prediction model may be trained using the feedback corrected input signal, the processed signal determined from feedback corrected input signal, the frequency- and/or level-dependent gain function, the feedback path transfer function, and the estimate of the feedback path transfer function.

Figure 6C:
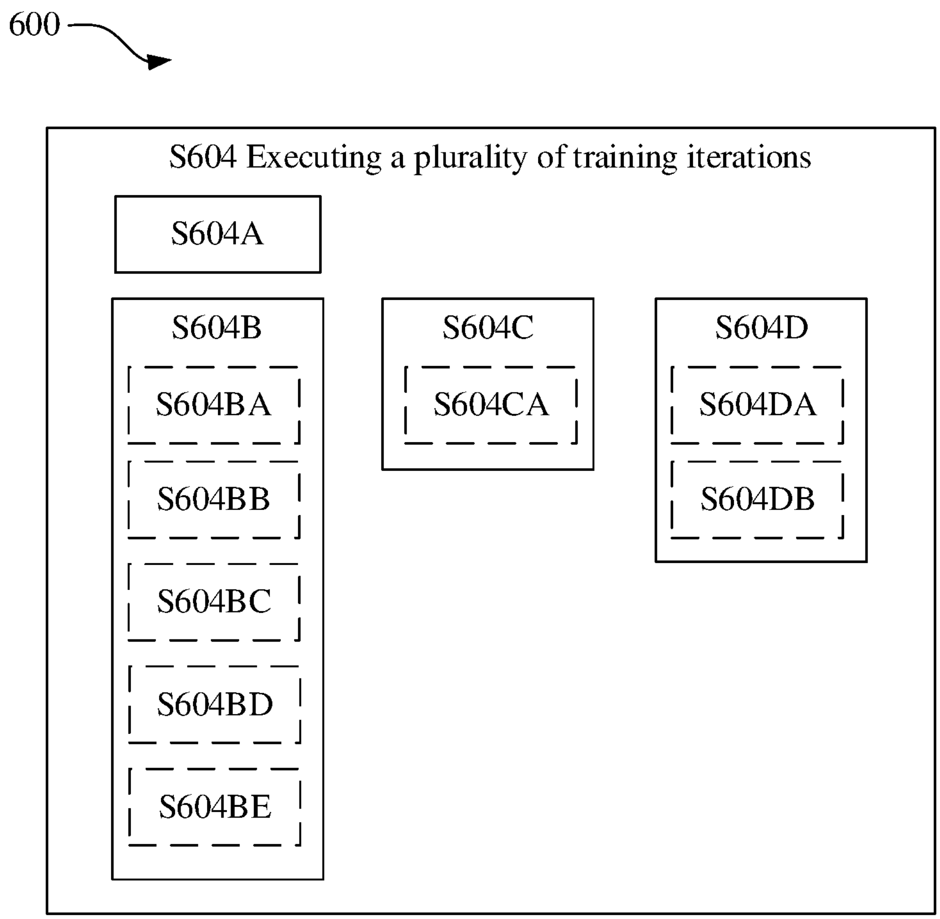

FIG. 6C shows a flow-chart illustrating an example method 600 of training a ML prediction model for use in an open loop transfer function estimator of a hearing aid, according to the present disclosure. The hearing aid is a hearing aid comprising a multi-channel system (such as hearing aid of FIG. 3).

The hearing aid comprising a multi-channel system may be seen as the hearing aid of FIG. 1A comprising a plurality of input transducers. The hearing aid comprising a multi-channel system may be seen as the hearing aid of FIG. 1B comprising a plurality of input transducers.

The open loop transfer function estimator (OLFTE) comprises the ML prediction model.

In one or more example methods, the method 600 is performed by an external device (e.g., a computer). In other words, the method 600 may be a computer-implemented method for training a ML model (e.g., the prediction model) of a hearing device (e.g., hearing aid of FIG. 3).

A training stage may be followed by an inference stage. In other words, the method 500 (e.g., of training the prediction model) may be followed by an inference method, such as method 300 of FIG. 6C. During the training stage, weights associated with the ML prediction model may be (continuously) updated. In the inference stage, the prediction model is trained (e.g., the weights may be fixed) and ready to be deployed.

The method 600 comprises executing S604 a plurality of training iterations.

Each training iteration of the plurality of training iterations comprises obtaining S604A, from the hearing aid, the simulation data.

The simulation data comprises a multitude of electric input signals, a processed output signal, and a multitude of feedback path transfer functions. Each of the electric input signal is representative of sound from a known, simulated acoustic environment of the hearing aid. The processed output signal is indicative of an applied frequency- and/or level-dependent gain function to a signal originating from the multitude of electric input signals. The multitude of feedback path transfer functions are representative of an impulse response of a corresponding multitude of feedback paths of the hearing aid.

In one or more example methods, the multitude of electric input signals may comprise M electric input signals (e.g., the hearing aid comprises M input transducers).

For example, the signal originating from the multitude of electric input signals may be seen as a spatially filtered signal. For example, a spatially filtered signal can be indicative of an applied beamformer filter to the multitude of electric input signals (e.g., when the hearing aid does not comprise a feedback cancellation system). For example, a spatially filtered signal can be indicative of an applied beamformer filter to the multitude of electric input signals, such as to a multitude of feedback corrected input signals (e.g., when the hearing aid does not comprise a feedback cancellation system).

In one or more example method, the simulation data can comprise a multitude of electric input signals, a processed output signal, a multitude of feedback path transfer functions, and the spatially filtered signal, when the hearing aid does not comprise a feedback cancellation system.

In one or more example methods, the simulation data can comprise a multitude of electric input signals, a processed output signal, a multitude of feedback path transfer functions, estimates of the multitude of feedback path transfer functions, and the spatially filtered signal, when the hearing aid comprises a feedback cancellation system.

For example, a feedback corrected input signal is indicative of a signal with reduced or cancelled acoustic or mechanical or electrical feedback, the acoustic or mechanical or electrical feedback originating from a feedback path. Each of the electric input signals may comprise an acoustic or mechanical or electrical feedback originating from a corresponding feedback path of the plurality of feedback paths of the hearing aid.

In one or more example methods, each training iteration of the plurality of training iterations comprises determining S604B the target open loop transfer function based on the frequency- and/or level-dependent gain function, the multitude of feedback path transfer functions, and the estimates of the multitude of feedback path transfer functions.

In one or more example methods, each training iteration of the plurality of training iterations comprises determining S504C a training open loop transfer function in dependence of the signal originating from the multitude of electric input signals (such as, the spatially filtered signal), the processed output signal, and the frequency- and/or level-dependent gain function.

For example, the ML prediction model is configured to receive as inputs the signal originating from the multitude of electric input signals (such as, the spatially filtered signal), the processed output signal, and the frequency- and/or level-dependent gain function, and provide as output the training open loop transfer function.

Each training iteration of the plurality of training iterations comprises updating S604D the ML prediction model based on the target open loop transfer function and the training open loop transfer function.

In one or more example methods, determining S604B the target open loop transfer function comprises determining S604BA a frequency response G(ω,n) of the applied frequency- and/or level-dependent gain function.

In one or more example methods, determining S604B the target open loop transfer function comprises determining S604BB a frequency response $H_m(\omega,n)$ of (e.g., for) each of the multitude of feedback path transfer functions. For example, determining the target open loop transfer function comprises determining the frequency response of the m-th feedback path transfer function, with m=1, . . . , M.

In one or more example methods, determining S604B the target open loop transfer function comprises determining S604BC a frequency response $$H'_m(\omega, n)$$

of the estimate of each of the multitude of feedback path transfer functions. For example, determining the target open loop transfer function comprises determining the frequency response of the estimate of the m-th feedback path transfer function, with m=1, . . . , M.

In one or more example methods, determining S604B the target open loop transfer function comprises determining S604BD a frequency response $B_m(\omega,n)$ of the beamformer filter for each input transducer channel of a multitude of input transducer channels. For example, determining the target open loop transfer function comprises determining the frequency response of the beamformer filter for the m-th input transducer channel, with $m=1, \ldots, M$. The term 'input transducer channel' (e.g., a microphone channel) may in the present context be taken to mean the input from a given input transducer (e.g. microphone) to the beamformer filter.

In one or more example methods, determining S604B the target open loop transfer function comprises determining S604BE the target open loop transfer function as $G(\omega,n). \Sigma m\ B_m(\omega,n)\cdot(H_m(\omega,n)-H'_m(\omega,n))$, where n denotes time, ω denotes frequency, and (·) denotes a product operator.

In one or more example methods, determining S604C the training open loop transfer function comprises providing S604CA the signal originating from the multitude of electric input signals (e.g., the spatially filtered signal), the frequency- and/or level-dependent gain function as input to the ML prediction model, and the processed output signal.

In one or more example methods, the ML prediction model comprises a deep neural network (DNN). For example, an DNN can comprise at least two neural networks (e.g., layers). For example, an DNN can comprise one or more of: a convolutional neural network (CNN), a recurrent neural network (RNN). For example, an DNN can comprise one or more of: a convolutional-based neural network, a recurrent-based neural network. An RNN may include a gated recurrent unit (GRU).

In one or more example methods, updating S604D the ML prediction model comprises determining S604DA a training error signal in dependence of the target open loop transfer function and the training open loop transfer function.

In one or more example methods, updating S604D the ML prediction model comprises updating S604DB weights, using a learning rule, of the ML prediction model based on the training error signal.

In one or more example methods, the training open loop transfer function comprises a training open-loop magnitude and a training open-loop phase. In one or more example methods, the target open loop transfer function comprises a target open-loop magnitude and a target open-loop phase.

For example, the ML prediction model may be trained using the multitude of electric input signals $(y_1(n), \ldots, y_M(n))$, or a multitude of signals $(e_1(n), \ldots, e_M(n))$ depending on the multitude of electric input signals $(y_1(n), \ldots, y_M(n))$, the processed signal determined from the multitude of electric input signals, or the multitude of signals depending on the multitude of electric input signals, the frequency- and/or level-dependent gain function, the multitude of feedback path transfer functions $(h_1(n) \ldots h_M(n)$, the estimate $(h'(n) \ldots h'_M(n))$ of each of the multitude of feedback path transfer functions, and the beamformer filter.

FIG. 7 schematically illustrates an example structure of a ML prediction model according to the present disclosure.

An open loop transfer function estimator of a hearing aid comprises the ML prediction model (ML-PM). The ML prediction model is configured to receive as input simulation data and provide as output a training open loop transfer function.

For a Hearing Aid without a Feedback Cancellation System:

The simulation data can comprise an electric input signal $(y(n))$, a processed output signal $(u(n))$, a frequency- and/or level-dependent gain function $(g(n))$, and a feedback path transfer function $(\underline{h}(n))$.

The electric input signal $(y(n))$ is representative of sound from a known, simulated acoustic environment of the hearing aid. The processed signal $(u(n))$ is indicative of an applied frequency- and/or level-dependent gain function $(g(n))$ to the electric input signal $(y(n))$. The feedback path transfer function $(\underline{h}(n))$ is representative of an impulse response of a feedback path (FBP) of the hearing aid.

The ML prediction model (e.g., an ML model) (ML-PM) may be configured to determine the training open loop transfer function $(\hat{\xi}_{Train}(\omega,n)))$ in dependence the electric input signal $(y(n))$, the processed output signal $(u(n))$, and the frequency- and/or level-dependent gain function $(g(n))$.

A loss function (LF) may be configured to receive a target open loop transfer function $(\hat{\xi}_{Targ}(\omega,n))$, the target open loop transfer function $(\hat{\xi}_{Targ}(\omega,n))$ being determined based on the frequency- and/or level-dependent gain function $(g(n))$ and the feedback path transfer function $(\underline{h}(n))$ (e.g., as described in reference to FIG. 6A).

For a Hearing Aid Comprising a Feedback Cancellation System:

The simulation data can comprise a feedback corrected input signal $(e(n))$, a processed output signal $(u(n))$, a frequency- and/or level-dependent gain function $(g(n))$, a feedback path transfer function $(\underline{h}(n))$, and an estimate $(\underline{h}'(n))$ of the feedback path transfer function $(\underline{h}(n))$.

The feedback corrected input signal $(e(n))$ is indicative of a signal with reduced or cancelled acoustic or mechanical or electrical feedback, the acoustic or mechanical or electrical feedback originating from the feedback path (FBP). The processed signal $(u(n))$ is indicative of an applied frequency- and/or level-dependent gain function $(g(n))$ to the feedback corrected input signal $(e(n))$. The feedback path transfer function $(\underline{h}(n))$ is representative of an impulse response of a feedback path (FBP) of the hearing aid.

The ML prediction model (ML-PM) may be configured to determine the training open loop transfer function $(\hat{\xi}_{Train}(\omega, n)))$ in dependence the feedback corrected input signal $(e(n))$, the processed output signal $(u(n))$, and the frequency- and/or level-dependent gain function $(g(n))$.

A loss function (LF) may be configured to receive a target open loop transfer function $(\hat{\xi}_{Targ}(\omega,n))$, the target open loop transfer function $(\hat{\xi}_{Targ}(\omega,n))$ being determined based on the frequency- and/or level-dependent gain function $(g(n))$, the feedback path transfer function $(\underline{h}(n))$, and the estimate $(\underline{h}'(n))$ of the feedback path transfer function $(\underline{h}(n))$ (e.g., as described in reference to FIG. 6B).

For a Hearing Aid Comprising a Multi-Channel System, the Multi-Channel System not Including a Feedback Cancellation System:

The simulation data can comprise a spatially filtered signal $(e(n))$, a processed output signal $(u(n))$, a frequency- and/or level-dependent gain function $(g(n))$, and a multitude of feedback path transfer functions $(h_1(n), \ldots, h_M(n))$.

The spatially filtered signal $(e(n))$ may be indicative of an applied beamformer filter to a multitude of electric input signals $(y_1(n), \ldots y_M(n))$, each of the multitude of electric input signals $(y_1(n), \ldots y_M(n))$ being representative of sound from a known, simulated acoustic environment of the hearing aid. The processed signal $(u(n))$ is indicative of an applied frequency- and/or level-dependent gain function $(g(n))$ to the spatially filtered signal $(e(n))$. Each of the multitude of feedback path transfer function $(h_1(n), \ldots, h_M(n))$ is representative of an impulse response of a corresponding multitude of feedback paths of the hearing aid.

The ML prediction model (ML-PM) may be configured to determine the training open loop transfer function $(\hat{\xi}_{Train}(\omega, n)))$ in dependence the spatially filtered signal $(e(n))$, the processed output signal $(u(n))$, and the frequency- and/or level-dependent gain function $(g(n))$.

A loss function (LF) may be configured to receive a target open loop transfer function $(\hat{\xi}_{Targ}(\omega,n))$, the target open loop transfer function ($\hat{\xi}_{Targ}(\omega,n)$) being determined based on the frequency- and/or level-dependent gain function (g(n)) and the multitude of feedback path transfer functions ($h_1(n), \ldots h_M(n)$) (e.g., as described in reference to FIG. 6C).

For a Hearing Aid Comprising a Multi-Channel System, the Multi-Channel System Including a Feedback Cancellation System:

The simulation data can comprise a spatially filtered signal (e(n)), a processed output signal (u(n)), a frequency- and/or level-dependent gain function (g(n)), a multitude of feedback path transfer functions ($h_1(n), \ldots, h_M(n)$), an estimate ($h'_1(n), \ldots, h'_M(n)$) of each of the multitude of feedback path transfer functions ($h_1(n), \ldots, h_M(n)$), and a beamformer filter.

The spatially filtered signal (e(n)) can be indicative of an applied beamformer filter to a multitude of feedback corrected input signals ($e_1(n), \ldots, e_M(n)$), the multitude of feedback corrected input signals being determined based on a corresponding multitude of electric input signals ($y_1(n), \ldots, y_M(n)$). Each of the multitude of electric input signals ($y_1(n)$, $y_M(n)$) is representative of sound from a known, simulated acoustic environment of the hearing aid. The processed signal (u(n)) is indicative of an applied frequency- and/or level-dependent gain function (g(n)) to the spatially filtered signal (e(n)). Each of the multitude of feedback path transfer function ($h_1(n), \ldots, h_M(n)$) is representative of an impulse response of a corresponding multitude of feedback paths of the hearing aid.

The ML prediction model (ML-PM) may be configured to determine the training open loop transfer function ($\hat{\xi}_{Train}(\omega, n)$)) in dependence the spatially filtered signal (e(n)), the processed output signal (u(n)), and the frequency- and/or level-dependent gain function (g(n)).

A loss function (LF) may be configured to receive a target open loop transfer function ($\hat{\xi}_{Targ}(\omega,n)$), the target open loop transfer function ($\hat{\xi}_{Targ}(\omega,n)$) being determined based on the frequency- and/or level-dependent gain function (g(n)), the multitude of feedback path transfer functions ($h_1(n), \ldots h_M(n)$), the estimate ($h'_1(n), \ldots, h'_M(n)$) of each of the multitude of feedback path transfer functions ($h_1(n), \ldots, h_M(n)$), and the beamformer filter (e.g., as described in reference to FIG. 6C).

For a hearing aid without a feedback cancellation system, a hearing aid comprising a feedback cancellation system, a hearing aid comprising a multi-channel system (the multi-channel system including a feedback cancellation system), a hearing aid comprising a multi-channel system (the multi-channel system without a feedback cancellation system);

The ML prediction model (ML-PN) comprises a deep neural network (DNN). For example, an DNN can comprise at least two neural networks (e.g., layers). For example, an DNN can comprise one or more of: a convolutional neural network (CNN), a recurrent neural network (RNN). For example, an DNN can comprise one or more of: a convolutional-based neural network, a recurrent-based neural network. An RNN may include a gated recurrent unit (GRU).

The loss function (LF) may be configured to determining a training error signal (er) in dependence of the target open loop transfer function ($\hat{\xi}_{Targ}(\omega,n)$) and the training open loop transfer function ($\hat{\xi}_{Train}(\omega,n)$)).

The ML prediction model (e.g., an ML model) (LA-PM) may be configured to update weights, using a learning rule, based on the training error signal.

The training open loop transfer function ($\hat{\xi}_{Train}(\omega,n)$) may comprises a training open-loop magnitude ($\hat{\xi}_{Train,M}(\omega,n)$)) and a training open-loop phase ($\hat{\xi}_{Train,P}(\omega,n)$). The target open loop transfer function ($\hat{\xi}_{Targ}(\omega,n)$) may comprises a target open-loop magnitude ($\hat{\xi}_{Targ,M}(\omega,n)$) and a target open-loop phase ($\hat{\xi}_{Targ,P}(\omega,n)$).

The term 'or a processed version thereof' may e.g. cover such extracted features from an original audio signal. The term 'or a processed version thereof' may e.g. also cover an original audio signal that has been subject to a processing algorithm that applies gain or attenuation and/or delay to the original audio signal and this results in a modified audio signal (preferably enhanced in some sense, e.g. noise reduced relative to a target signal, e.g. feedback corrected, or simply delayed).

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Examples of methods and products (method and hearing aid) according to the disclosure are set out in the following items:

Item 1. A hearing aid (HD) comprising a forward path for processing an electric signal representing sound, the forward path comprising an input unit (IU) for receiving or providing at least one electric input signal (y(n)) representing sound, a signal processing unit (PRO) configured to apply a frequency- and/or level-dependent gain function (g(n)) to said at least one electric input signal (y(n)), or to a signal or signals originating therefrom, and providing a processed output signal (u(n)) in dependence thereof, and an output transducer (OT) for generating stimuli perceivable as sound to a user in dependence of said processed output signal (u(n));

wherein the hearing aid (HD) further comprises an open loop transfer function estimator (OLTFE) for estimating a current open loop transfer function, wherein the current open loop transfer function comprises an open-loop magnitude and an open-loop phase, respectively, and wherein the open loop transfer function estimator comprises a learning algorithm comprising a trained prediction model configured to provide an estimate of the open-loop magnitude ($\xi'_M(\omega,n)$) and an estimate of the open-loop phase ($\xi'_P(\omega,n)$), respectively, and wherein the hearing aid is configured-in a training mode of operation—to allow training of the prediction model using simulation data from known, simulated acoustic situations.

Item 2. A hearing aid according to item 1 wherein the prediction model has been trained with said simulation data, wherein the simulation data comprises the processed signal (u(n)) determined from known input data (y(n)), the frequency- and/or level-dependent gain function (g(n)) applied to the known input data (y(n)), and calculated open-loop magnitude and open-loop phase based on the frequency- and/or level-dependent gain function (g(n)) and a known feedback path transfer function (h(n)).

Item 3. A hearing aid according to item 1 or 2 wherein the prediction model has been trained with simulation data from a multitude of simulations comprising different feedback path transfer functions (h(n)), different frequency- and/or level-dependent gain functions (g(n)), and different external input signals (x(n)) to the hearing aid, wherein the external input signal is the part of the electric input signal (y(n)) that is not due to feedback.

Item 4. A hearing aid according to any one of items 1-3 wherein a calculated open loop transfer function, the calculated open loop transfer function comprising the calculated open-loop magnitude and phase, for said simulation data is determined as $$\xi(\omega, n) = G(\omega, n) \cdot H(\omega, n),$$

wherein G(ω,n) is a frequency response of the frequency- and/or level-dependent gain function (g(n)), and H(ω,n) is a frequency response of the known feedback path transfer function (h(n)), and where n represents time, and ω represents frequency.

Item 5. A hearing aid according to any one of items 1-4 further comprising a feedback control system configured to cancel or reduce feedback via an acoustic or mechanical or electrical feedback path transfer function (h(n)) from said output transducer (OT) to said input unit (IU) in said at last one electric input signal (y(n)), and to provide an estimate (v'(n)) of a current feedback signal (v(n)) received by the input unit via said feedback path, and to provide a feedback corrected input signal (e(n)) in dependence of said at least one electric input signal (y(n)), or a signal dependent thereon, and said estimate of a current feedback signal (v'(n)): wherein said feedback control unit is configured to provide an estimate (h'(n)) of the feedback path impulse response (h(n)).

Item 6. A hearing aid according to item 5 wherein the calculated open loop transfer function for said simulation data is determined as $$\xi(\omega, n) = G(\omega, n) \cdot (H(\omega, n) - H'(\omega, n)),$$

wherein G(ω,n) is a frequency response of the frequency- and/or level-dependent gain function (g(n)), H(ω,n) is a frequency response of the known feedback path transfer function (h(n)), H'(ω,n) is a frequency response of the estimate (h'(n)) of the feedback path impulse response (h(n)), and where n represents time, and ω represents frequency.

Item 7. A hearing aid according to items 5 or 6 wherein the prediction model has been trained with said simulation data, wherein the simulation data comprises the feedback corrected input signal (e(n)) determined from known input data (y(n)), the processed signal (u(n)) determined from known input data (y(n)), the frequency- and/or level-dependent gain function (g(n)) applied to the known input data (y(n)), and calculated open-loop magnitude and open-loop phase based on based on the frequency- and/or level-dependent gain function (g(n)), the known feedback path transfer function (h(n)), and the estimate h'(n) of the known feedback path transfer function (h(n)).

Item 8. A hearing aid according to any one of items 5-7 wherein the feedback control system comprises an adaptive filter (ALG, FIL, h'(n)) configured to provide said estimate (h'(n)) of the current feedback path (h(n)).

Item 9. A hearing aid according to any one of items 1-8 comprising a beamformer filter (BF) configured to provide a spatially filtered signal (e(n)) in dependence of a multitude of electric input signals ($y_1(n), \ldots y_M(n)$), or signals depending thereon ($e_1(n), \ldots, e_M(n)$).

Item 10. A hearing aid according to item 9 wherein the open-loop transfer function is given by $$\xi(\omega, n) = G(\omega, n) \cdot \sum_m B_m(n) \cdot (H_m(\omega, n) - H'_m(\omega, n)),$$

where $B_m(\omega,n)$ is the frequency response of the beamformer filter for each microphone channel m=1 . . . , M, and $H_m(\omega,n)$ and $H'_m(\omega,n)$ are frequency responses for the m'th feedback path ($h_m(n)$) and the adaptive filter ($h'_m(n)$).

Item 11. A hearing aid according to any one of items 1-10 wherein the frequency- and/or level-dependent gain function (g(n)) is controlled in dependence of the estimate of the open loop transfer function- Item 12. A hearing aid according to any one of items 1-14 being constituted by or comprising an air-conduction type hearing aid or a bone-conduction type hearing aid, or a combination thereof.

Item 13. A method of training an open loop transfer function estimator of a hearing aid, the hearing aid (HD) comprising a forward path for processing an electric signal representing sound, the forward path comprising an input unit (IU) for receiving or providing at least one electric input signal (y(n)) representing sound, a signal processing unit (PRO) configured to apply a frequency- and/or level-dependent gain function (g(n)) to said at least one electric input signal (y(n)), or to a signal or signals originating therefrom, and providing a processed output signal (u(n)) in dependence thereof, and an output transducer (OT) for generating stimuli perceivable as sound to a user in dependence of said processed output signal (u(n));

wherein the hearing aid further comprises an open loop transfer function estimator (OLTFE) for estimating the current open loop transfer function in the form of an open-loop magnitude and an open-loop phase, respectively, and wherein the method comprises providing that the open loop transfer function estimator comprises a learning algorithm comprising a prediction model configured to provide the open-loop magnitude and an open-loop phase, respectively, wherein the prediction model is trained using simulation data from known, simulated acoustic situations.

Item 14. A method according to item 13 wherein the prediction model is trained with said simulation data, wherein the simulation data comprises a feedback corrected input signal (e(n)) determined from known input data (y(n)), the processed signal (u(n)) determined from known input data (y(n)), and the frequency- and/or level-dependent gain function (g(n)) applied to the known input data (y(n)), and calculated open-loop magnitude and open-loop phase based on the frequency- and/or level-dependent gain function (g(n)), and one or more of: the feedback path transfer function (h(n)), and an estimate (h'(n)) of the feedback path transfer function (h(n)).

Item 15. A method according to item 13 or 14 wherein the prediction model is trained with simulation data from a multitude of simulations comprising different feedback path transfer functions (h(n)), different frequency- and/or level-dependent gain functions g(n)), and different external input signals (x(n)) to the hearing aid, wherein the external input signal is the part of the electric input signal that is not due to feedback.

REFERENCES

EP3291581A2 (Oticon) 7 Mar. 2018
EP4033784A1 (Oticon) 27 Feb. 2022

The invention claimed is:

1. A method of training a machine learning (ML) prediction model for use in an open loop transfer function estimator (OLFTE) of a hearing aid (HD), wherein the open loop transfer function estimator (OLFTE) comprises the ML prediction model (ML-PM), wherein the method comprises:

executing a plurality of training iterations, each training iteration of the plurality of training iterations comprising:

obtaining, from the hearing aid, simulation data comprising:

at least one electric input signal (y(n)) representing sound from a known, simulated acoustic environment of the hearing aid (HD), a processed output signal (u(n)) indicative of an applied frequency- and/or level-dependent gain function (g(n)) to the at least one electric input signal (y(n)), or to a signal or signals originating therefrom, and a feedback path transfer function (h(n)) representative of an impulse response of a feedback path (FBP) of the hearing aid; and determining a target open loop transfer function ($\hat{\xi}_{Targ}$(ω,n)) in dependence of the frequency- and/or level-dependent gain function (g(n)) and the feedback path transfer function (h(n));

determining a training open loop transfer function ($\hat{\xi}_{Train}$(ω,n))) in dependence of said at least one electric input signal (y(n)), or to a signal or signals originating therefrom, the processed output signal (u(n)), and the frequency- and/or level-dependent gain function (g(n)); and updating the ML prediction model in dependence of the target open loop transfer function ($\hat{\xi}_{Targ}$(ω,n)) and the training open loop transfer function ($\hat{\xi}_{Train}$(ω, n))).

2. The method according to claim 1, wherein determining the target open loop transfer function ($\hat{\xi}_{Targ}$(ω,n)) comprises:

determining a frequency response G(ω,n) of the applied frequency- and/or level-dependent gain function (g(n));

determining a frequency response H(ω,n) of the feedback path transfer function (h(n)); and determining the target open loop transfer function ($\hat{\xi}_{Targ}$(ω,n)) as, $$\hat{\xi}_{Targ}(\omega, n) = G(\omega, n) \cdot H(\omega, n),$$

wherein n denotes time, and w denotes frequency.

3. The method according to claim 1, the simulation data further comprising:

a feedback corrected input signal (e(n)) indicative of a signal with reduced or cancelled acoustic or mechanical or electrical feedback, the acoustic or mechanical or electrical feedback originating from the feedback path (FBP); and an estimate (h'(n)) of the feedback path transfer function (h(n));

wherein each training iteration of the plurality of training iterations comprises:

determining the target open loop transfer function ($\hat{\xi}_{Targ}$(ω,n)) based on the frequency- and/or level-dependent gain function (g(n)), the feedback path transfer function (h(n)), and the estimate (h'(n)) of the feedback path transfer function (h(n)); and determining the training open loop transfer function ($\hat{\xi}_{Train}$(ω,n)) in dependence of said the feedback corrected input signal (e(n)), the processed output signal (u(n)), and the frequency- and/or level-dependent gain function (g(n)).

4. The method according to claim 3, wherein determining the target open loop transfer function ($\hat{\xi}_{Targ}$(ω,n)) comprises:

determining a frequency response G(ω,n) of the applied frequency- and/or level-dependent gain function (g(n));

determining a frequency response H(ω,n) of the feedback path transfer function (h(n));

determining a frequency response H'(ω,n) of the estimate (h'(n)) of the feedback path transfer function (h(n)); and determining the target open loop transfer function ($\hat{\xi}_{Targ}$(ω,n)) as, $$\hat{\xi}_{Targ}(\omega, n) = G(\omega, n) \cdot (H(\omega, n) - H'(\omega, n)),$$

wherein n denotes time, and w denotes frequency.

5. The method according to claim 1, wherein determining the training open loop transfer function ($\hat{\xi}_{Train}$(ω,n))) comprises:

providing the at least one electric input signal (y(n)), or to a signal or signals originating therefrom, the processed output signal (u(n)), and the frequency- and/or level-dependent gain function (g(n)) as input to the ML prediction model.

6. The method according to claim 1, wherein the ML prediction model comprises a deep neural network (DNN).

7. The method according to claim 1, wherein updating the ML prediction model comprises:

determining a training error signal in dependence of the target open loop transfer function ($\hat{\xi}_{Targ}(\omega,n)$) and the training open loop transfer function ($\hat{\xi}_{Train}(\omega,n)$)); and updating weights, using a learning rule, of the ML prediction model based on the training error signal.

8. The method according to claim 1, wherein the training open loop transfer function ($\hat{\xi}_{Train}(\omega,n)$) comprises a training open-loop magnitude ($\hat{\xi}_{Train,M}(\omega,n)$) and a training open-loop phase ($\hat{\xi}_{Train,P}(\omega,n)$).

9. The method according to claim 1, wherein the method is performed by an external device.

10. A hearing aid (HD) comprising a forward path for processing an electric signal representing sound, the forward path comprising:

an input unit (IU) for receiving or providing at least one electric input signal (y(n)) representing sound of an environment of the hearing aid, a signal processing unit (PRO) configured to apply a frequency- and/or level-dependent gain function (g(n)) to said at least one electric input signal (y(n)), or to a signal or signals originating therefrom, and provide a processed output signal (u(n)) in dependence thereof, and an output transducer (OT) for generating stimuli perceivable as sound to a user in dependence of said processed output signal (u(n));

wherein hearing aid (HD) further comprises an open loop transfer function estimator (OLTFE) comprising a trained ML prediction model configured to estimate an open loop transfer function ($\xi'(\omega,n)$) in dependence of said at least one electric input signal (y(n)), or to a signal or signals originating therefrom, and the processed output signal (u(n)), and wherein the ML prediction model is trained according to the method of claim 1.

11. The hearing aid according to claim 10, wherein the hearing aid further comprises a feedback control system configured to cancel or reduce feedback via an acoustic or mechanical or electrical feedback path (FBP) from said output transducer (OT) to said input unit (IU) in said at last one electric input signal (y(n)), and provide:

an estimate (v'(n)) of a current feedback signal (v(n)) received by the input unit via said feedback path;

a feedback corrected input signal (e(n)) in dependence of said at least one electric input signal (y(n)), or a signal dependent thereon, and said estimate (v'(n)) of the current feedback signal (v(n)); and an estimate (h'(n)) of the feedback path transfer function (h(n)), wherein the feedback path transfer function (h(n)) is representative of an impulse response of a feedback path (FBP) from said output transducer (OT) to said input unit (IU) in said at last one electric input signal (y(n)).

12. The hearing aid according to claim 11, wherein the feedback control system comprises an adaptive filter (ALG, FIL, h'(n)) configured to provide the estimate (h'(n)) of the feedback path transfer function (h(n)).

13. The hearing aid according to claim 11, the open loop transfer function estimator (OLTFE) comprising the trained prediction model is configured to estimate the open loop transfer function ($\xi'(\omega,n)$) in dependence of the feedback corrected input signal (e(n)) and the processed output signal (u(n)).

14. The hearing aid according to claim 10, wherein the estimated open loop transfer function ($\xi'(\omega,n)$) comprises an estimated open-loop magnitude ($\xi'_M(\omega,n)$) and an estimated open-loop phase ($\xi'_p(\omega,n)$).

15. A hearing aid according to claim 10, wherein the frequency- and/or level-dependent gain function (g(n)) is controlled in dependence of the estimated open loop transfer function ($\xi'(\omega,n)$).

* * * * *